(12) United States Patent
Miyairi et al.

(10) Patent No.: US 7,867,598 B2
(45) Date of Patent: Jan. 11, 2011

(54) HONEYCOMB STRUCTURE AND HONEYCOMB CATALYTIC BODY

(75) Inventors: Yukio Miyairi, Nagoya (JP); Naomi Noda, Nagoya (JP); Yukio Mizuno, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 1135 days.

(21) Appl. No.: 11/511,460

(22) Filed: Aug. 29, 2006

(65) Prior Publication Data

US 2007/0048494 A1   Mar. 1, 2007

(30) Foreign Application Priority Data

Aug. 31, 2005 (JP) ............................. 2005-250872
Mar. 2, 2006 (JP) ............................. 2006-055781

(51) Int. Cl.
*B32B 3/12* (2006.01)
*B01D 39/06* (2006.01)

(52) U.S. Cl. ........................... 428/116; 428/117; 55/523
(58) Field of Classification Search ....................... None
See application file for complete search history.

(56) References Cited

U.S. PATENT DOCUMENTS

| | | | |
|---|---|---|---|
| 2003/0166450 A1 | 9/2003 | Kumazwa et al. | |
| 2003/0224933 A1* | 12/2003 | Kondo et al. | 502/439 |
| 2004/0033175 A1 | 2/2004 | Ohno et al. | |
| 2004/0161373 A1 | 8/2004 | Ichikawa et al. | |
| 2005/0129907 A1* | 6/2005 | Yamaguchi | 428/116 |
| 2005/0158534 A1* | 7/2005 | Tabuchi et al. | 428/304.4 |
| 2006/0154817 A1 | 7/2006 | Nomura et al. | |

FOREIGN PATENT DOCUMENTS

| | | |
|---|---|---|
| JP | A 2003-033664 | 2/2003 |
| JP | A 2003-40687 | 2/2003 |
| JP | A 2004-251137 | 9/2004 |
| JP | A 2004-261644 | 9/2004 |
| WO | WO 02/26351 A | 4/2002 |
| WO | WO 03/082770 A1 | 10/2003 |

* cited by examiner

*Primary Examiner*—Gordon R Baldwin
(74) *Attorney, Agent, or Firm*—Oliff & Berridge, PLC

(57) ABSTRACT

A honeycomb structure having porous partition walls having a large number of pores, formed so as to produce a plurality of cells each extending between the two ends of the honeycomb structure, and plugged portions formed so as to plug the cells at either one end of the honeycomb structure or at the insides of the cells, wherein the honeycomb structure has the partition walls of a permeability of $7 \times 10^{-12}$ to $4 \times 10^{-8}$ $m^2$. The honeycomb structure can provide a honeycomb catalyst structure which is superior in purification efficiency, is low in pressure loss and can be mounted even in a limited space.

22 Claims, 9 Drawing Sheets

CUTTING OUT

US 7,867,598 B2

HONEYCOMB STRUCTURE AND HONEYCOMB CATALYTIC BODY

TECHNICAL FIELD

The present invention relates to a honeycomb structure and a honeycomb catalyst structure both suitably used for purification of to-be-purified components such as carbon monoxide (CO), hydrocarbons (HC), nitrogen oxides (NOx), sulfur oxides (SOx) and the like, contained in the exhaust gases emitted from automobile engines, construction equipment engines, industrial stationery engines, combustion equipment, etc.

BACKGROUND ART

Currently, catalysts having a honeycomb structure (hereinafter referred to as honeycomb catalyst structures) are in use in order to purify the exhaust gases emitted from engines, etc. These honeycomb catalyst structures have a construction, as shown in FIG. 6, of partition walls 4 defining cells 3 and a catalyst layer 15 carried on the surface of partition walls 4. As shown in FIGS. 4 and 5, when an exhaust gas is purified using a honeycomb catalyst structure 60 (a honeycomb structure 11), the exhaust gas is allowed to flow into each cell 3 of the honeycomb catalyst structure 60 from its one end 2a, is allowed to contact with the catalyst layer (not shown) present on the surface of partition walls 4, and is discharged outside from the other end 2b of the honeycomb catalyst structure 60, whereby the exhaust gas is purified (see, for example, Patent Literature 1).

In purifying an exhaust gas using such a honeycomb catalyst structure, it is necessary to hasten the arrival of the to-be-purified components of the exhaust gas at the catalyst layer present on the surface of partition walls and increase the purification efficiency for exhaust gas. In order to increase the purification efficiency for exhaust gas, it is necessary, for example, to make small the hydraulic diameter of cell and make large the surface area of partition wall. In an example of the specific method therefor, the number of cells per unit area, that is, cell density is increased.

Here, it is known that the ratio of arrival (arrival ratio) of the to-be-purified components of exhaust gas at the catalyst layer on the surface of partition walls increases in inverse proportion to the square of the hydraulic diameter of cell. Therefore, a larger cell density results in an increased arrival ratio of to-be-purified components. However, pressure loss tends to increase as well in inverse proportion to the square of the hydraulic diameter of cell. Thus, there is a problem that pressure loss increases together with the increase in the arrival ratio of to-be-purified components.

Incidentally, the thickness of the catalyst layer on the surface of partition walls is ordinarily about several tens of µm. When the velocity of diffusion of to-be-purified components in catalyst layer is insufficient, the purification efficiency of honeycomb catalyst structure tends to be low. This tendency is striking particularly at low temperatures. Hence, in order to obtain a high purification efficiency for exhaust gas, it is necessary not only to increase the surface area of catalyst layer but also to reduce the thickness of catalyst layer to increase the velocity of diffusion of to-be-purified components in catalyst layer. Therefore, the increase in cell density produces an advantage of an increase in the surface area of catalyst layer but incurs a problem of an increase in pressure loss.

In order to reduce pressure loss with attainment of a high purification efficiency for exhaust gas, it is necessary to increase the inlet diameter of honeycomb catalyst structure and further reduce the velocity of the exhaust gas to be passed through the honeycomb catalyst structure. However, when the honeycomb catalyst structure has been made, for example, in a large size so as to be mounted on a vehicle or the like, the mounting thereof may be difficult because the space for mounting is limited.

Patent Literature 1: JP-A-2003-33664

SUMMARY OF THE INVENTION

The present invention has been made in view of the above-mentioned problems of conventional techniques. The present invention aims at providing a honeycomb structure which is superior in purification efficiency, low in pressure loss and mountable even in a limited space, and a honeycomb catalyst structure which is superior in purification efficiency, low in pressure loss and mountable even in a limited space.

The present inventors made an intensive study in order to achieve the above aim. As a result, it was found that the aim could be achieved by allowing the partition walls constituting a honeycomb structure to have a permeability set in a particular value range. The finding has led to the completion of the present invention.

According to the present invention, there are provided a honeycomb structure and a honeycomb catalyst structure, both described below.

[1] A honeycomb structure having:

porous partition walls having a large number of pores, formed so as to produce a plurality of cells extending between the two ends of the honeycomb structure, and plugged portions formed so as to plug the cells at either one end of the honeycomb structure or at the insides of the cells, wherein the honeycomb structure has the partition walls of a permeability of $7 \times 10^{-12}$ to $4 \times 10^{-8}$ m$^2$.

[2] A honeycomb structure according to [1], wherein a cell hydraulic diameter (m) and the permeability (m$^2$) of the partition walls satisfy the relation:

(cell hydraulic diameter)$^2$/(permeability)=$2 \times 10^3$ or more and less than $6 \times 10^5$.

[3] A honeycomb structure according to [1] or [2], wherein an image maximum distance average is more than 250 µm but not more than 500 µm.

[4] A honeycomb structure according to [1] or [2], wherein a cell density of the cells is 4 to 46.5 cells/cm$^2$, a thickness of the partition walls is 0.3 to 0.43 mm, an image maximum distance average is 250 to 500 µm, and a porosity is 40 to 65%.

[5] A honeycomb structure according to [1] or [2], wherein a cell density of the cells is 0.25 to 46.5 cells/cm$^2$, a thickness of the partition walls is 0.15 to 7 mm, an image maximum distance average is 40 to 3,000 µm, a porosity is 30 to 80%, and a standard deviation of the common logarithm of pore diameter distribution is 0.1 to 0.6.

[6] A honeycomb structure according to [1] or [2], wherein a cell density of the cells is 1.55 to 15.5 cells/cm$^2$, a thickness of the partition walls is 0.4 to 2 mm, an image maximum distance average is 50 to 500 µm, a porosity is 40 to 65%, and a standard deviation of the common logarithm of pore diameter distribution is 0.2 to 0.6.

[7] A honeycomb structure according to [1] or [2], wherein a cell density of the cells is 1.55 to 12.4 cells/cm$^2$, a thickness of the partition walls is 0.7 to 1.5 mm, an image maximum distance average is more than 250 µm but not more than 500 µm, a porosity is 40 to 65%, and a standard deviation of the common logarithm of pore diameter distribution is 0.2 to 0.6.

[8] A honeycomb structure according to any of [1] to [7], wherein 30 to 90% of the cells are through-hole cells having no the plugged portion.

[9] A honeycomb structure according to any of [1] to [7], wherein 30 to 50% of the cells are through-hole cells having no the plugged portion.

[10] A honeycomb structure according to any of [1] to [9], which is made of a material contained a ceramic as a major component, or of a sintered metal.

[11] A honeycomb structure according to [10], wherein the ceramic is at least one member selected from the group consisting of silicon carbide, cordierite, alumina titanate, sialon, mullite, silicon nitride, zirconium phosphate, zirconia, titania, alumina and silica.

[12] A honeycomb structure according to any of [1] to [11], wherein a thermal expansion coefficient at 40 to 800° C. in the extending direction of the cells is less than $1.0 \times 10^{-6}/°$ C.

[13] A honeycomb catalyst structure having:
a honeycomb structure set forth in any of [1] to [12], and
a catalyst layer containing a catalyst, carried in a layered form on at least the inner surfaces of the pores of the partition walls of the honeycomb structure, wherein the honeycomb catalyst structure has the partition walls of the honeycomb structure of a large number of pores carried with a catalyst layer.

[14] A honeycomb catalyst structure according to [13], wherein the partition walls have a permeability of $6.8 \times 10^{-12}$ to $3 \times 10^{-8}$ $m^2$.

[15] A honeycomb catalyst structure according to [13] or [14], wherein a cell hydraulic diameter (m) and the permeability ($m^2$) of the partition walls satisfy the relation:

(cell hydraulic diameter)$^2$/(permeability)=$2 \times 10^3$ or more and less than $6 \times 10^5$.

[16] A honeycomb catalyst structure according to any of [13] to [15], wherein an image maximum distance average of the partition walls under a state wherein the catalyst layer is carried is 40 to 3,000 μm and a porosity is 30 to 80%.

[17] A honeycomb catalyst structure according to any of [13] to [15], wherein an image maximum distance average of the partition walls under a state wherein the catalyst layer is carried is 50 to 500 μm and a porosity is 40 to 65%.

[18] A honeycomb catalyst structure according to any of [13] to [15], wherein an image maximum distance average of the partition walls under a state wherein a catalyst layer is carried is more than 250 μm but not more than 500 μm and a porosity is 40 to 65%.

[19] A honeycomb catalyst structure according to any of [13] to [18], wherein the catalyst is a three-way catalyst for purification of gasoline engine exhaust gas, containing:
a carrier coat comprising active alumina,
at least one metal carried inside the carrier coat in a dispersed state, selected from the group consisting of Pt, Rh and Pd, and
at least one compound contained in the carrier coat, selected from the group consisting of cerium oxide, zirconium oxide and silica.

[20] A honeycomb catalyst structure according to any of [13] to [18], wherein the catalyst is an oxidation catalyst for purification of gasoline engine or diesel engine exhaust gas, containing at least one noble metal selected from the group consisting of Pt, Rh and Pd.

[21] A honeycomb catalyst structure according to any of [13] to [18], wherein the catalyst is a SCR catalyst for NOx selective reduction, containing at least one member selected from the group consisting of metal-substituted zeolite, vanadium, titania, tungsten oxide, silver and alumina.

[22] A honeycomb catalyst structure according to any of [13] to [18], wherein the catalyst is an NOx storage catalyst containing an alkali metal and/or an alkaline earth metal.

[23] A honeycomb catalyst structure according to any of [13] to [22], wherein a ratio (L/d) of equivalent diameter d and length L in central axis direction is 0.3 or more but less than 0.75.

[24] A honeycomb catalyst structure according to any of [19] to [22], wherein a ratio (L/d) of equivalent diameter d and length L in central axis direction is 0.3 or more but less than 0.75, a cell density is 4 to 46.5 cells/$cm^2$, a thickness of partition wall is 0.3 to 0.43 mm, an image maximum distance average is 250 to 500 μm, a porosity is 60 to 80%, and a standard deviation of the common logarithm of pore diameter distribution is 0.2 to 0.6.

The honeycomb structure of the present invention can provide a honeycomb catalyst structure which is superior in purification efficiency, is low in pressure loss and can be mounted even in a limited space.

The honeycomb catalyst structure of the present invention is superior in purification efficiency, is low in pressure loss and can be mounted even in a limited space.

EXPLANATIONS OF SYMBOLS 1, 11, 21, 31, 41, 51, 61, 71, 81, 91: honeycomb structure; 2a, 2b: end; 3: cell; 3a: through-hole cell; 4: partition wall; 4a: thin partition wall; 5, 15: catalyst layer; 6: observation range (visual field); 10: plugged portion; 20: outer wall; 25: pore; 35: catalyst layer-carried pore; 50, 60, 70, 80, 90, 110, 120, 130, 140, 150: honeycomb catalyst structure; 100: test piece; 105: residual rib; D: cell hydraulic diameter; H: height of residual rib; P: cell pitch; T, t: partition wall thickness

BEST MODE FOR CARRYING OUT THE INVENTION

Next, description is made on the best embodiment of the present invention. However, the present invention is not restricted to the following embodiment and it should be construed that appropriate changes, improvements, etc. can be added to the following embodiment based on the ordinary knowledge of those skilled in the art unless there is no deviation from the gist of the present invention and that the resulting embodiments also are included in the present invention.

Figure 1:
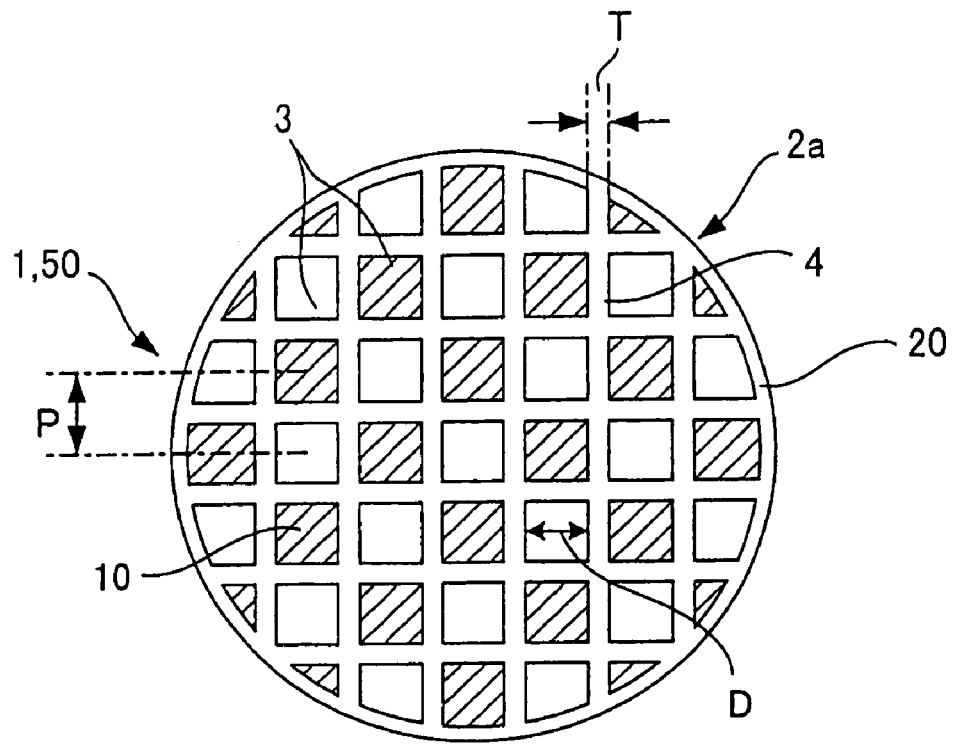
FIG. 1 is a front view schematically showing an embodiment of the honeycomb structure and honeycomb catalyst structure of the present invention.
Figure 2:
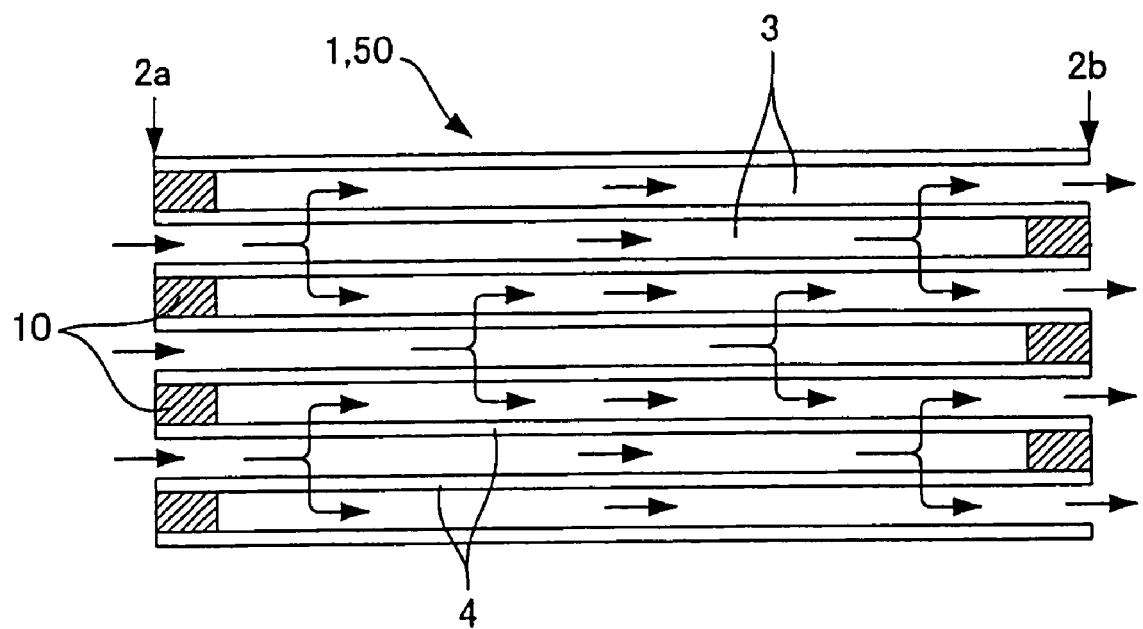
FIG. 2 is a sectional view schematically showing an embodiment of the honeycomb structure and honeycomb catalyst structure of the present invention.

FIG. 1 is a front view schematically showing an embodiment of the honeycomb structure and the honeycomb catalyst structure both of the present invention, and FIG. 2 is a sectional view schematically showing an embodiment of the honeycomb structure and the honeycomb catalyst structure both of the present invention. As shown in FIGS. 1 and 2, the honeycomb structure 1 of the present embodiment has porous partition walls 4 having a large number of pores and plugged portions 10. The partition walls 4 are formed so as to produce a plurality of cells 3 extending between the two ends 2a and 2b of the honeycomb structure 1. The plugged portions 10 are produced so as to plug the cells 3 at either one end 2a or 2b of the honeycomb structure 1. Incidentally, in FIG. 1, a symbol 20 is an outer wall; a symbol P is a cell pitch; a symbol D is a cell hydraulic diameter; and a symbol T is a partition wall thickness.

Each partition wall 4 of the honeycomb structure 1 of the present embodiment has a permeability of $7 \times 10^{-12}$ to $4 \times 10^{-8}$ m$^2$, preferably $1 \times 10^{-11}$ to $8 \times 10^{-10}$ m$^2$, more preferably $3 \times 10^{-11}$ to $3 \times 10^{-10}$ m$^2$. When each partition wall 4 has a permeability controlled in the above range and when such a honeycomb structure 1 has a particular catalyst carried thereon to use as a honeycomb catalyst structure 50, the fine carbon particles, etc. contained in an exhaust gas emitted from a diesel engine are hardly captured by the partition wall 4 and most of them pass through the partition wall 4. That is, as shown in FIG. 2, the exhaust gas which has flowed into each cell 3 of the honeycomb catalyst structure 50 from its one end 2a, passes through each partition wall 4, migrates into adjacent cells, and then is discharged outside from other end 2b. In this case, since each partition wall 4 of the honeycomb structure 1 of the present embodiment has a permeability controlled in a particular range, the fine carbon particles, etc. contained in the exhaust gas are hardly captured by each partition wall 4 of the honeycomb catalyst structure 50 obtained using the honeycomb structure 1. Thus, with the honeycomb structure 1 of the present embodiment, there can be obtained a honeycomb catalyst structure 50 which is low in pressure loss and, even when used over a long period, hardly shows any increase in pressure loss.

Figure 3:
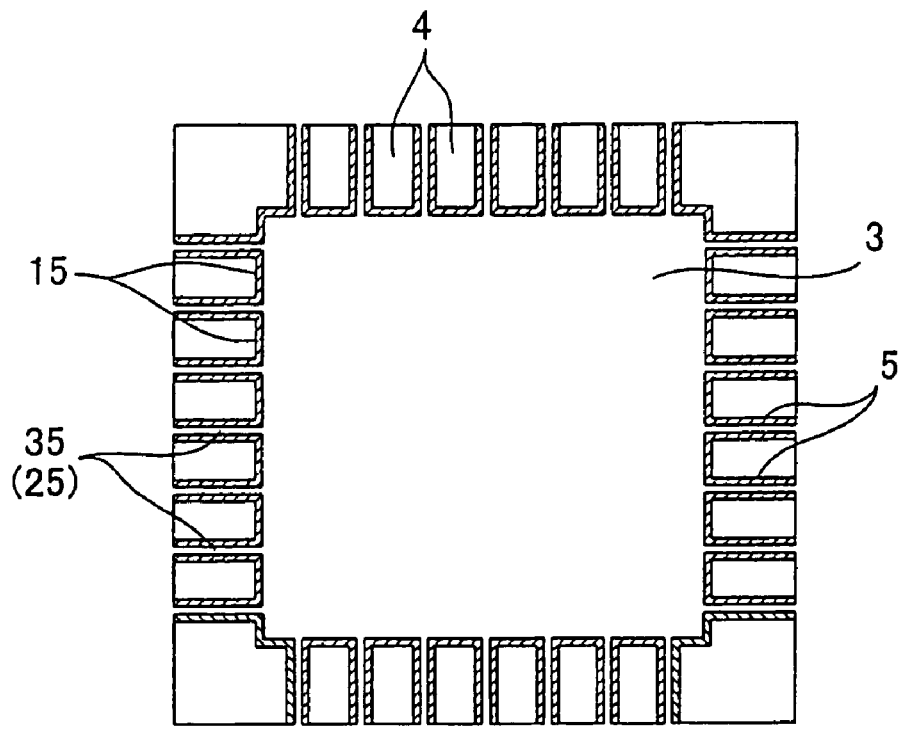
FIG. 3 is a partly enlarged view schematically showing an embodiment of the honeycomb structure of the present invention.
Figure 4:
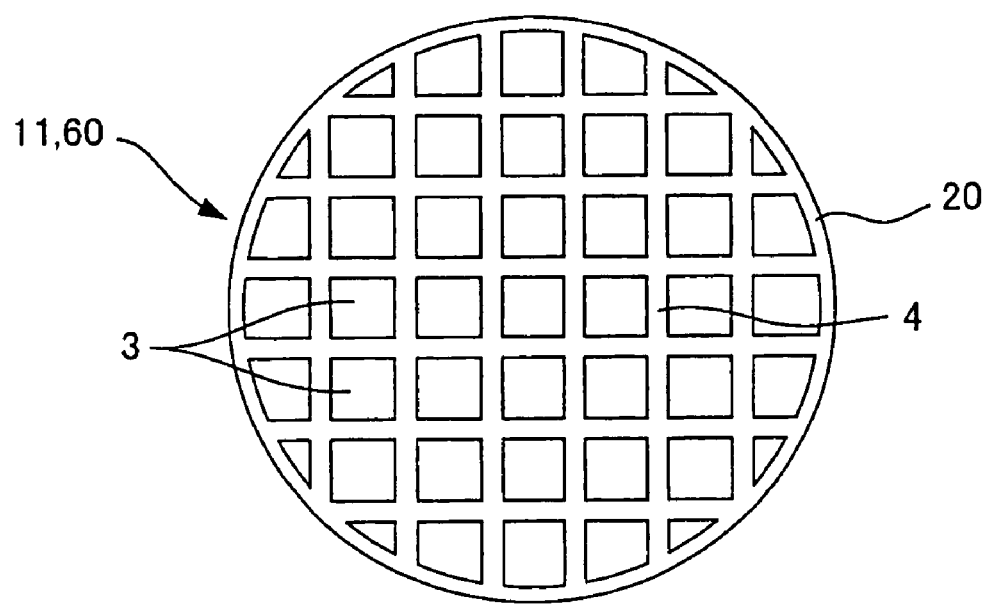
FIG. 4 is a front view schematically showing an embodiment of conventional honeycomb structures and conventional honeycomb catalyst structures.
Figure 5:
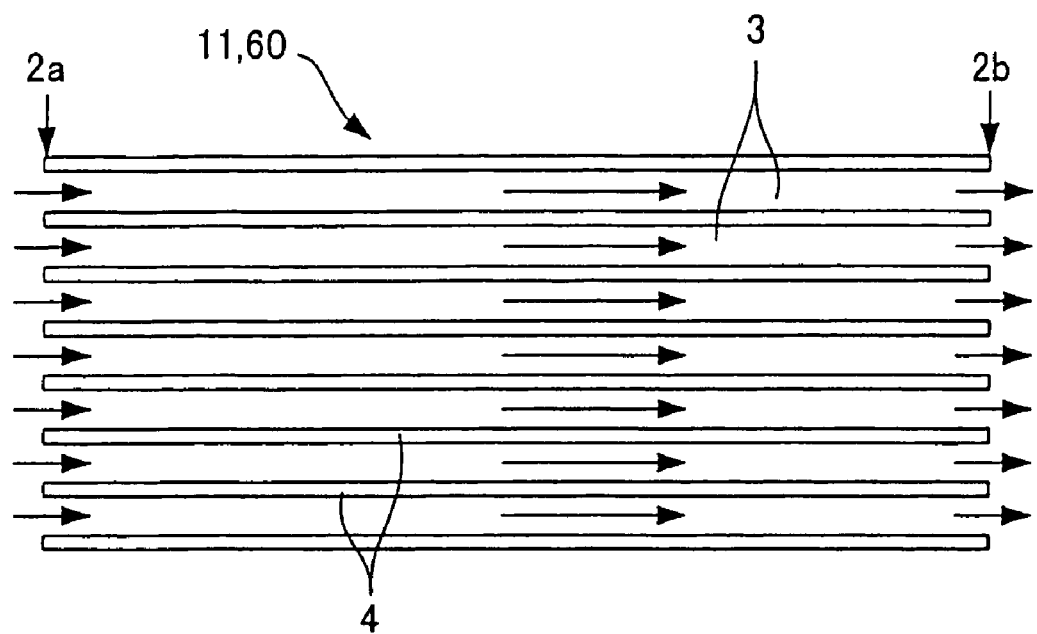
FIG. 5 is a sectional view schematically showing an embodiment of conventional honeycomb structures and conventional honeycomb catalyst structures.
Figure 6:
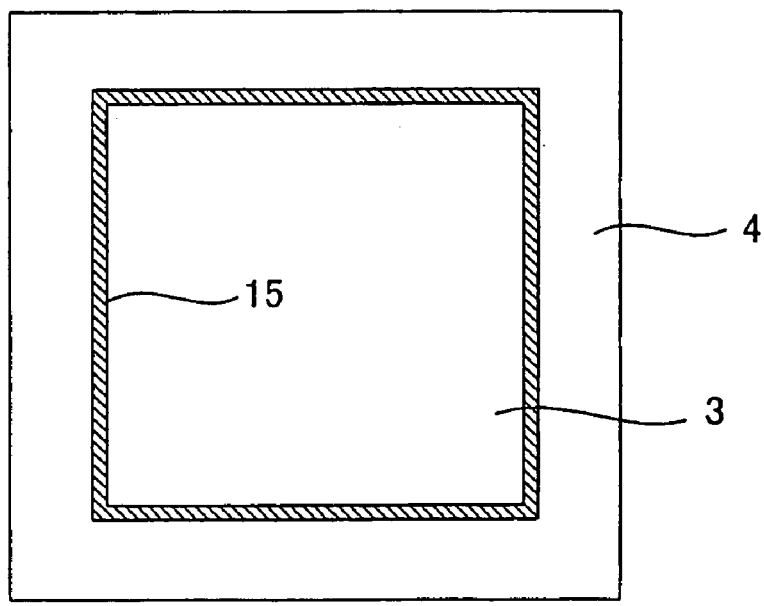
FIG. 6 is a partly enlarged view schematically showing an embodiment of conventional honeycomb catalyst structures.

Also, with the honeycomb structure 1 of the present embodiment, unlike in the case of a conventional honeycomb catalyst structure 60 such as shown in FIGS. 4 to 6, a catalyst layer 5 can be carried on the surface of each pore 25 of each partition wall 4, as shown in FIG. 3. Therefore, there can be provided a compact honeycomb catalyst structure 50 which is superior in purification efficiency to the conventional honeycomb catalyst structure and can be mounted even in a limited space. Incidentally, the detailed description on the honeycomb structure 50 is made later.

Incidentally, the "permeability" referred to in the present specification is a physical property calculated by the following expression (1) and is an index indicating the passing-through resistance shown when a target gas passes through a sample (partition wall). In the expression (1), C is a permeability (m$^2$); F is a gas flow rate (cm$^3$/s); T is a sample thickness (cm); V is a gas viscosity (dynes·sec/cm$^2$); D is a sample diameter (cm); and P is a gas pressure (PSI). In the following expression (1), 13.839 (PSI)=1 (atm), and 68947.6 (dynes·sec/cm$^2$)=1 (PSI).

[Expression 1]

$$C = [8FTV \div (\pi D^2 (P^2 - 13.839^2)/(13.839 \times 68947.6))] \times 10^{-4} \quad (1)$$

Figure 10:
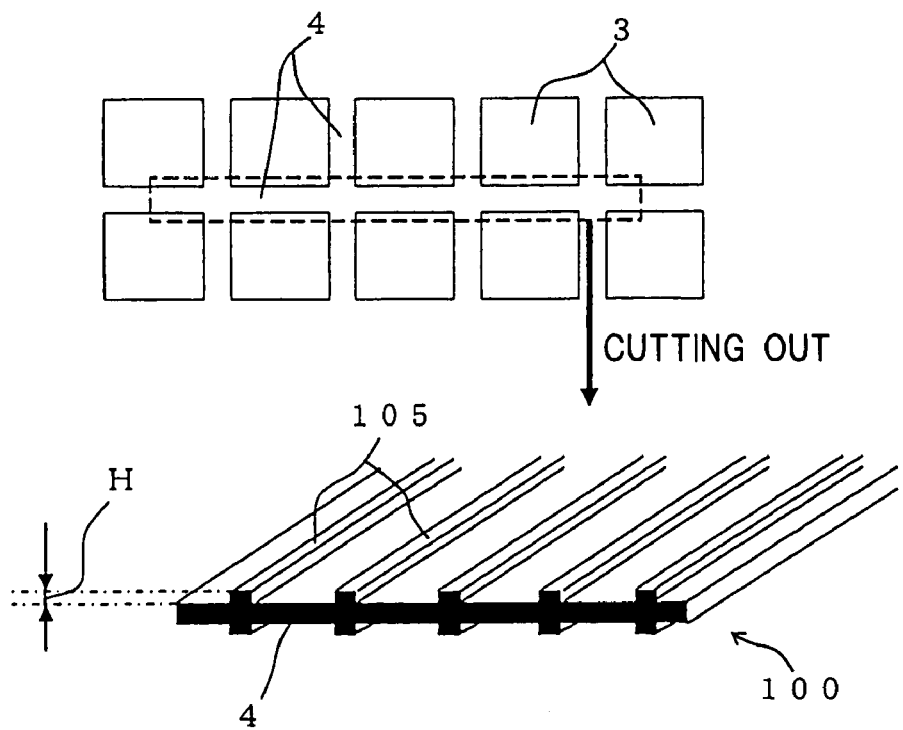
FIG. 10 is a schematic view explaining a test piece used in the measurement of permeability.

FIG. 10 is a schematic view explaining a test piece used in the measurement of permeability. As shown in FIG. 10, firstly, a test piece 100 is cut out from a honeycomb structure or a honeycomb catalyst structure in a state that a part (residual rib 105) of each partition wall intersecting one partition wall 4 is left at a residual rib height (H) of 0.2 mm. The shape of this test piece 100 may be a polygonal plate or a circular plate. Air of room temperature is passed through the test piece 100 and its permeability is calculated using the above-mentioned expression (1). Desirably, a fluid seal such as grease or the like is used in combination with a sealing material so that no air is leaked from the gap between the test piece 100 and the sealing material, formed by the residual ribs 105. The flow rate of air is adjusted so that the calculated velocity of air during passing through partition wall becomes 0.1 to 1 cm/sec, and there is used a result measured with this air flow rate. Incidentally, when the target of measuring the permeability is the partition walls of honeycomb catalyst structure, the carried form of catalyst layer differs at the inner wall of cell and at the cut surface. However, in the honeycomb catalyst structure using the honeycomb structure of the present embodiment, a catalyst layer is carried on the inner surface of pores. Therefore, the effect of residual rib is small and the permeability of partition wall of honeycomb catalyst structure can be measured in the same manner as in the case of honeycomb structure.

In FIGS. 1 and 2, each plugged portion 10 is shown in a state that it is formed so as to plug a cell 3 at one end 2a or 2b. However, in the honeycomb structure of the present invention, the formation state of plugged portion is not restricted to such a formation state. For example, one plugged portion 10 can be formed inside each cell 3, as in the honeycomb structure 21 shown in FIG. 7. Also, as in the honeycomb structure 31 shown in FIG. 8, it is possible to form each one plugged portion 10 for part of the cells 3 and form no plugged portion 10 for the remaining cells 3. Further, as in the honeycomb structure 41 shown in FIG. 9, it is possible to form each one plugged portion 10 inside part of the cells 3 and form each one plugged portion 10 for the remaining cells 3 at their ends 2b. It is preferred that, as shown in FIG. 2, a plugged portion 10 is formed for each cell at either one end 2a or 2b of honeycomb structure because a honeycomb catalyst structure superior in purification efficiency can be provided. As in the honeycomb structures shown in FIGS. 7 to 9, formation of plugged portion 10 inside cell 3 is preferred because a reduced pressure loss is obtained. Presence of cells 3 having no plugged portion 10, i.e. through-holes cells 3a, as shown in FIG. 8 is also preferred because a reduced pressure loss can be obtained.

Figure 11:
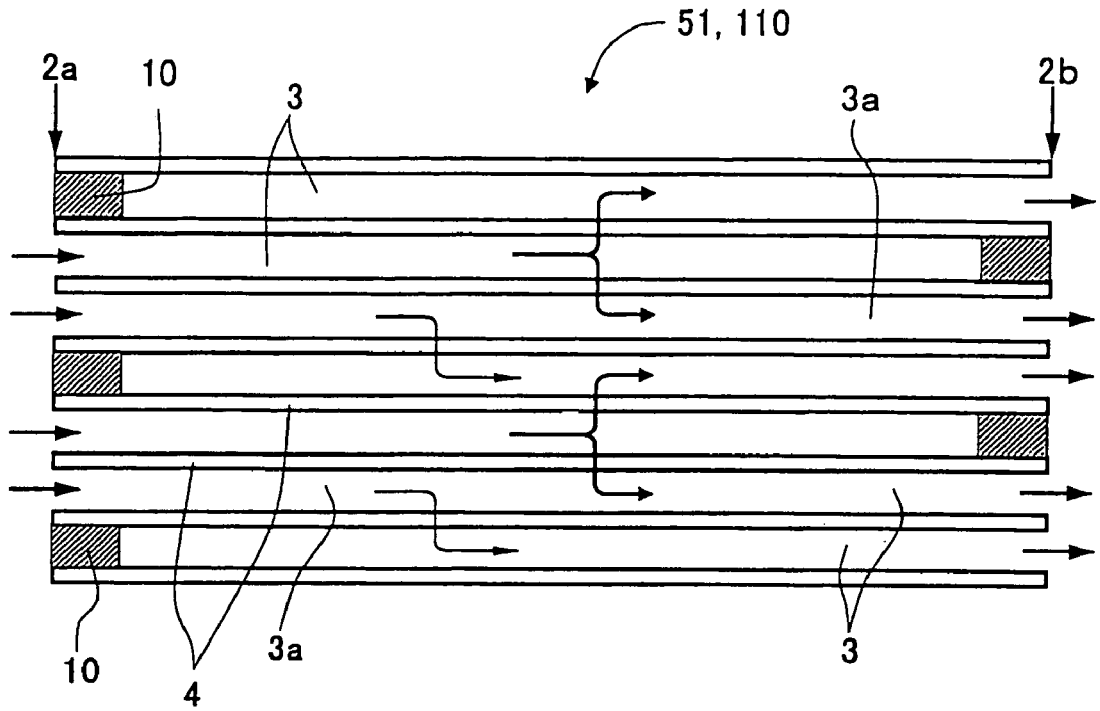
FIG. 11 is a sectional view schematically showing still other embodiment of the honeycomb structure and the honeycomb catalyst structure both of the present invention.
Figure 12:
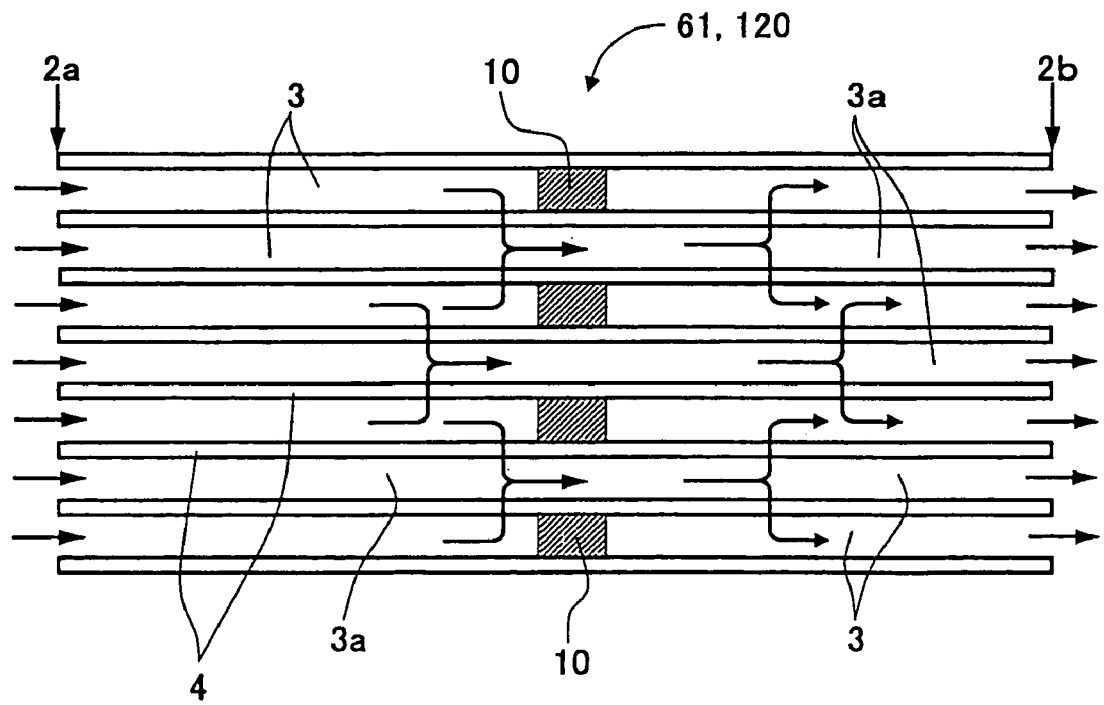
FIG. 12 is a sectional view schematically showing still other embodiment of the honeycomb structure and the honeycomb catalyst structure both of the present invention.
Figure 13:
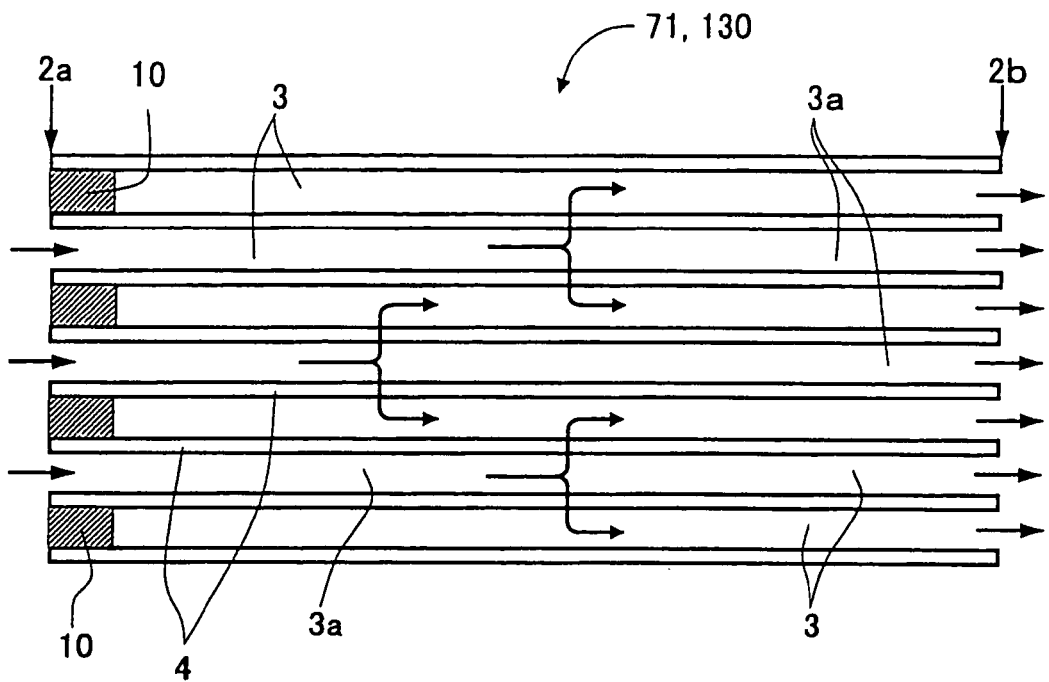
FIG. 13 is a sectional view schematically showing still other embodiment of the honeycomb structure and the honeycomb catalyst structure both of the present invention.
Figure 14:
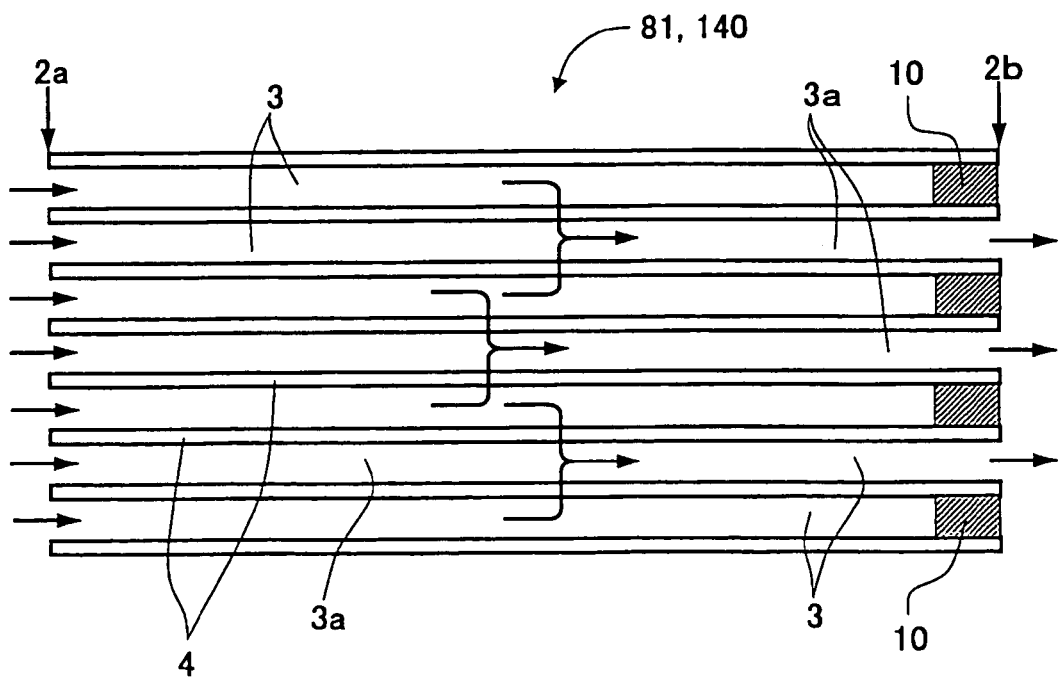
FIG. 14 is a sectional view schematically showing still other embodiment of the honeycomb structure and the honeycomb catalyst structure both of the present invention.
Figure 15:
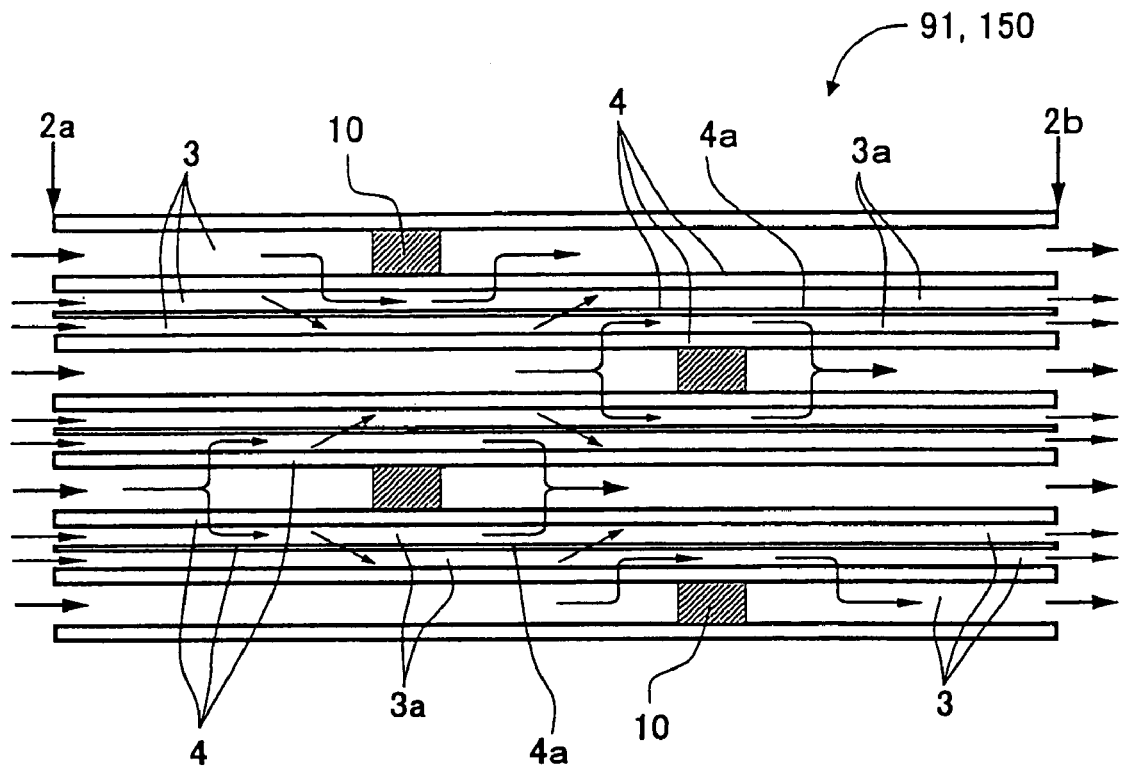
FIG. 15 is a sectional view schematically showing still other embodiment of the honeycomb structure and the honeycomb catalyst structure both of the present invention.

As other embodiment of the honeycomb structure having a reduced pressure loss owing to the above-mentioned through-hole cells, there can be mentioned a structure such as honeycomb structure 51 shown in FIG. 11, wherein part of the cells 3 are through-hole cells 3a and the remaining cells 3 have each a plugged portion 10 at either end 2a or 2b. There can be also be mentioned a structure such as honeycomb structure 61 shown in FIG. 12, wherein part of the cells 3 are through-hole cells 3a and the remaining cells 3 have each inside a plugged portion 10 so that such plugged portions 10 are arranged at the same position in the central axis direction of the structure. There can also be mentioned a structure such as honeycomb structure 71 shown in FIG. 13, wherein part of the cells 3 are through-hole cells 3a and the remaining cells 3 have each a plugged portion 10 at one end 2a (a gas inlet end), and a structure such as honeycomb structure 81 shown in FIG. 14, wherein part of the cells 3 are through-hole cells 3a and the remaining cells 3 have each a plugged portion 10 at one end 2b (a gas outlet end). There can also be mentioned a honeycomb structure 91 such as shown in FIG. 15, wherein part of the cells 3 are through-hole cells 3a, the remaining cells 3 have each inside a plugged portion 10 at a different position in the central axis direction of the structure, and each through-hole cell 3a is divided by a thin partition wall 4a.

The proportion of the through-hole cells having no plugged portion, in the total cells is preferably 30 to 90%, more preferably 30 to 50%. When the proportion is less than 30%, the effect of reduced pressure loss may not be obtained sufficiently; when the proportion is more than 90%, no sufficient purification efficiency may be obtained.

In the honeycomb structure 1 of the present embodiment, the cell hydraulic diameter D (m) and the permeability (m$^2$) of the partition walls satisfy preferably a relation of:

$$(\text{cell hydraulic diameter})^2/(\text{permeability})=2\times10^3 \text{ or more and less than } 6\times10^5,$$

more preferably a relation of:

$$(\text{cell hydraulic diameter})^2/(\text{permeability})=5\times10^3 \text{ to } 1\times10^5,$$

particularly preferably a relation of:

$$(\text{cell hydraulic diameter})^2/(\text{permeability})=1\times10^4 \text{ to } 5\times10^4.$$

The pressure loss arising when a gas passes through cells (the pressure loss during passing through cell), is in inverse proportion to the square of cell hydraulic diameter. Also, the ratio of the pressure loss arising when a gas passes through each partition wall (the pressure loss during passing through partition wall) and the pressure loss during passing through cell; "(pressure loss during passing through partition wall)/(pressure loss during passing through cell)" is in proportion to "(cell hydraulic diameter)$^2$/(permeability)". Here, a "(cell hydraulic diameter)$^2$/(permeability)" of $2\times10^3$ or more is preferred because, when such a honeycomb structure 1 is made into a honeycomb catalyst structure 50, a gas can easily pass uniformly through the whole portions of the partition walls 4 of the honeycomb catalyst structure 50. Meanwhile, a "(cell hydraulic diameter)$^2$/(permeability)" of less than $6\times10^5$ is preferred because, when such a honeycomb structure 1 is made into a honeycomb catalyst structure 50, there is substantially no increase in pressure loss in the whole portion of the structure 50.

The density of cells 3 (cell density) of the honeycomb structure 1 of the present embodiment is preferably 0.25 to 46.5 cells/cm$^2$ (1.61-300 cpsi), more preferably 1.55 to 15.5 cells/cm$^2$ (10 to 100 cpsi), particularly preferably 1.55 to 12.4 cells/cm$^2$ (10 to 80 cpsi). When the cell density is less than 0.25 cell/cm$^2$, the efficiency of contact with exhaust gas tends to be insufficient. Meanwhile, when the cell density is more than 46.5 cells/cm$^2$, the pressure loss tends to increase. Incidentally, "cpsi" is an abbreviation of "cells per square inch" and is a unit indicating the number of cells per square inch. 10 cpsi is about 1.55 cells/cm$^2$.

The thickness of partition wall 4 (partition wall thickness T) is preferably 0.15 to 7 mm (5.9 to 276 mil), more preferably 0.4 to 2 mm (15.7 to 78.7 mil), particularly preferably 0.7 to 1.5 mm (27.6 to 59 mil). When the partition wall thickness T is less than 0.15 mm, the strength is insufficient and the thermal shock resistance may be low. Meanwhile, when the partition wall thickness T is more than 7 mm, the pressure loss tends to be large. Here, 1 mil is 1/1,000 inch and is about 0.025 mm.

Figure 16:
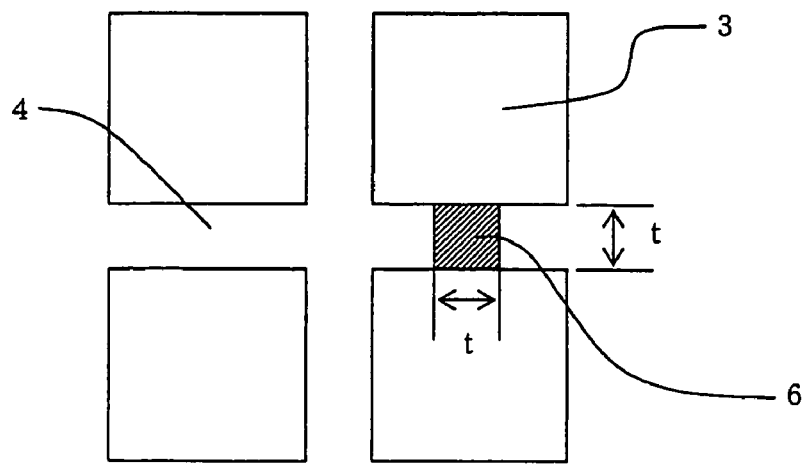
FIG. 16 is a plan view schematically showing a state in which part of the end of an embodiment of the honeycomb structure of the present invention has been enlarged.
Figure 17:
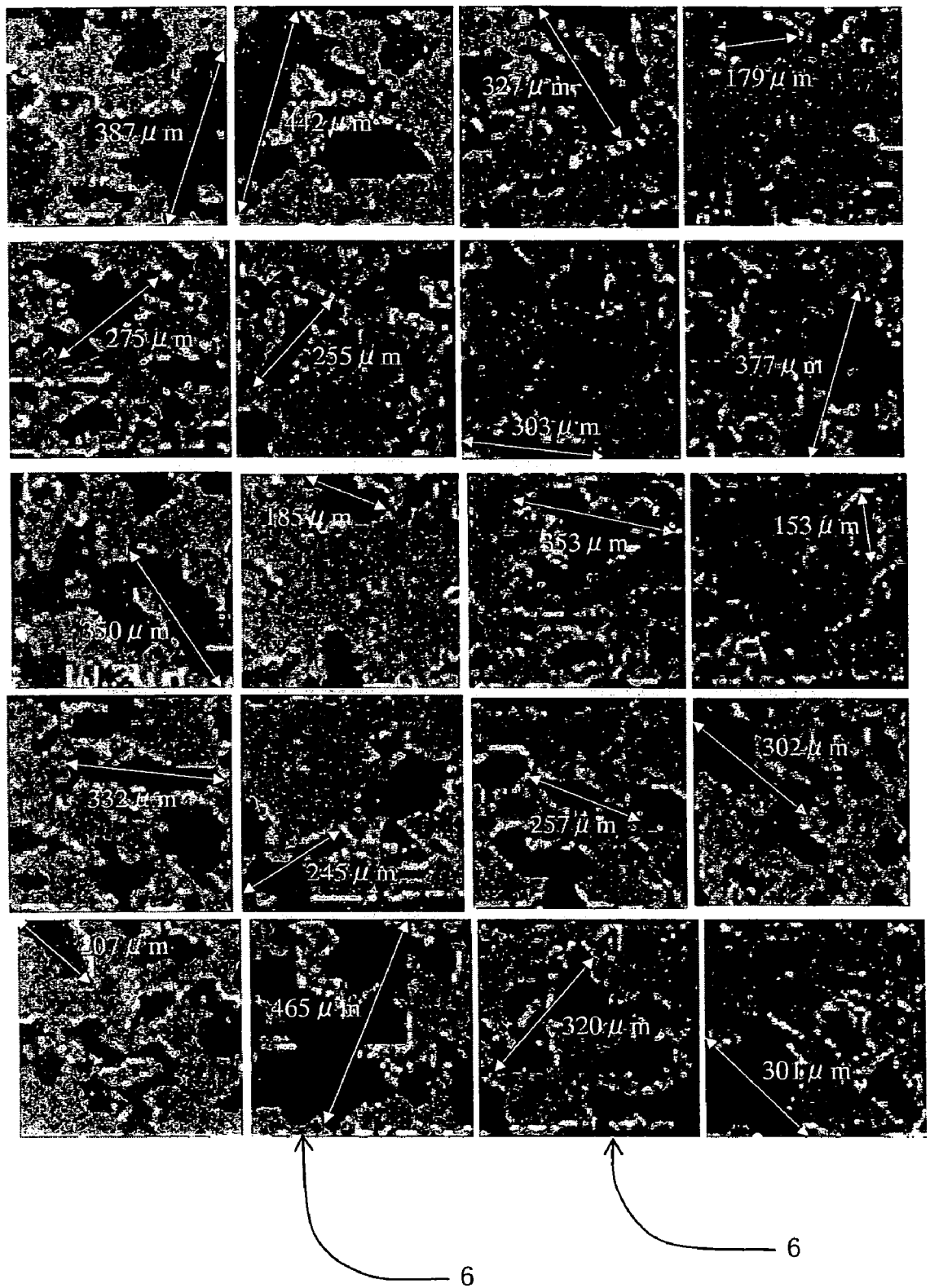
FIG. 17 is SEM photographs of an embodiment of the honeycomb structure of the present invention.

The image maximum distance average of partition wall 4 is preferably 40 to 3,000 μm, more preferably 50 to 500 μm, particularly preferably larger than 250 μm but not larger than 500 μm. When the image maximum distance average is smaller than 40 μm, an increase in pressure loss tends to arise since fine particles such as fine carbon particles contained in the exhaust gas emitted from a diesel engine are captured easily. Meanwhile, when the image maximum distance average is larger than 3,000 μm, it tends to become difficult to secure the sufficient contact area between exhaust gas and catalyst layer. Incidentally, "pore diameter" referred to in the present specification is a physical property value measured by image analysis. Specifically explaining, SEM photographs of partition wall section are observed for 20 visual fields each of (length×width=t×t) wherein "t" is the thickness of partition wall; then, in each visual field observed, the maximum straight line distance of pore is measured; an average of the maximum straight line distances of all the visual fields is calculated; the average was taken as "image maximum distance average". For example, in the plan view of FIG. 16 wherein part of the end of honeycomb structure has been enlarged, the t×t range of partition wall 4 is taken as one observation range (visual field); SEM photographs are taken for 20 visual fields; image analysis is conducted; as shown in FIG. 17, the maximum straight line distance of pore in each visual field is measured; an average of the 20 distances measured is calculated. In the SEM photographs of 20 visual fields, shown in FIG. 17, each maximum straight line distance is, from the uppermost column left end toward right end and from upper column toward lower column, 387 μm, 442 μm, 327 μm, 179 μm, 275 μm, 255 μm, 303 μm, 377 μm, 350 μm, 185 μm, 353 μm, 153 μm, 332 μm, 245 μm, 257 μm, 302 μm, 207 μm, 465 μm, 320 μm and 301 μm. In this case, the image maximum distance average becomes 301 μm. Incidentally, the SEM photographs shown in FIG. 17 were taken at a 50 magnification. In the image analysis, a commercial image analysis soft can be used and, for example, Paint Shop Prox (trade name) produced by COREL Co. can be used. The magnification of SEM photograph may be any magnification as long as a clear image is obtained and, for example, any magnification ranging from 10 to 1,000 can be selected.

The porosity of partition wall 4 is preferably 30 to 80%, more preferably 40 to 65%, particularly preferably 50 to 65%. When the porosity is less than 30%, the velocity of gas during passing through partition wall increases and the purification efficiency for gas tends to be deteriorated. Meanwhile, when the porosity is more than 80%, the strength of partition wall tends to be insufficient. Incidentally, "porosity" referred to in the present specification is a physical property value measured by image analysis. Specifically explaining, SEM photographs of partition wall section are observed for at least 5 visual fields each of (length×width=t×t) wherein t is the thickness of partition wall; in each visual field observed, a ratio of pore area is determined; each ratio is raised to the three seconds (3/2) power; an average of all the resulting values of all the visual fields is calculated and was taken as "porosity".

As the combination of the density of cell, the thickness of partition wall, the image maximum distance average of partition wall, and the porosity of partition wall, there are preferred-a cell density of 4 to 46.5 cells/cm$^2$, a partition wall thickness of 0.3 to 0.43 mm, an image maximum distance average of partition wall, of larger than 250 μm but not larger than 500 μm, and a partition wall porosity of 40 to 65%. By allowing each parameter to have such a value, the resulting honeycomb structure can be suitably used as a carrier for constituting a catalyst structure for industrially purifying the exhaust gas emitted from industrial combustion equipment.

The standard deviation of the common logarithm of pore diameter distribution of partition wall 4, i.e. pore diameter distribution a is preferably 0.1 to 0.6, more preferably 0.2 to 0.6. When the pore diameter distribution a is less than 0.1, the pressure loss during passing through partition wall tends to increase. Meanwhile, when the partition wall distribution σ is more than 0.6, a gas passes through only large pores and resultantly the purification performance for gas tends to deteriorate. The "pore diameter distribution" used for determination of "standard deviation of the common logarithm of pore diameter distribution" is measured using a mercury porosimeter and, using the pore diameter distribution obtained and the following expressions (2) to (5), there is determined a standard deviation of common logarithm [sd (standard deviation) in the following expression (5)]. Incidentally, with respect to the differential pore volume indicated by "f" in the following expressions (3) and (4), when, for example, the pore volume of pores having diameters of DP 1 or less, i.e. the accumulated pore volume of pores having diameters 0 to DP 1 is expressed as V1 and the pore volume of pores having diameters of DP 2 or less, i.e. the accumulated pore volume of pores having diameters 0 to DP 2 is expressed as V2, the differential pore volume f2 is a value indicated by (V2−V1). In the following expressions (2) to (5), "Dp" indicates pore diameter (μm); "f" indicates differential pore volume (mL/g); "x" indicates the common logarithm of pore diameter Dp; "xav" indicates an average of x; "s$^2$" indicates a variance of x; and "sd" indicates the standard deviation (standard deviation of the common logarithm of pore diameter distribution) of x.

[Expression 2]

$$x = \log Dp \quad (2)$$

$$xav = \Sigma xf/\Sigma f \quad (3)$$

$$s^2 = \Sigma x^2 f/\Sigma f - xav^2 \quad (4)$$

$$sd = \sqrt{s^2} \quad (5)$$

Incidentally, when the cell density is 0.25 to 46.5 cells/cm$^2$, the partition wall thickness is 0.15 to 7 mm, the image maximum distance average of partition wall is 40 to 3,000 μm, the porosity of partition wall is 30 to 80% and the standard deviation of the common logarithm of pore diameter distribution of partition wall is 0.1 to 0.6, such a honeycomb structure is suitable as a carrier for constituting an industrial catalyst structure for purifying the exhaust gas emitted from industrial combustion equipment.

Also, when the cell density is 1.55 to 12.4 cells/cm$^2$, the partition wall thickness is 0.7 to 1.5 mm, the image maximum distance average of partition wall is larger than 250 μm but not larger than 500 μm, the porosity of partition wall is 40 to 65% and the standard deviation of the common logarithm of pore diameter distribution of partition wall is 0.2 to 0.6, such a honeycomb structure is suitable as a carrier for constituting an industrial catalyst structure, particularly, a carrier for constituting a catalyst structure for vehicle mounting for purification of the exhaust gas emitted from automobile engines.

As preferred examples of the material constituting the honeycomb structure 1 of the present embodiment, there can be mentioned a material contained a ceramic as a major component and a sintered metal. As preferred examples of the ceramic when the honeycomb structure 1 of the present embodiment is made of a material contained a ceramic as a major component, there can be mentioned silicon carbide, cordierite, alumina titanate, sialon, mullite, silicon nitride, zirconium phosphate, zirconia, titania, alumina, silica and combinations thereof. Particularly preferred are ceramics such as silicon carbide, cordierite, mullite, silicon nitride, alumina and the like, for the alkali resistance. Of these, oxide type ceramics are preferred from the cost standpoint.

The thermal expansion coefficient of the honeycomb structure 1 of the present embodiment, at 40 to 800° C. in the cell-extending direction is preferably less than 1.0×10$^{-6}$/° C., more preferably less than 0.8×10$^{-6}$/° C., particularly preferably 0.5×10$^{-6}$/° C. When the thermal expansion coefficient in the cell-extending direction at 40 to 800° C. is less than 1.0×10$^{-6}$/° C., the thermal stress generating when exposed to an exhaust gas of high temperature, can be suppressed in an allowable range and the thermal stress-destruction of the honeycomb structure can be prevented.

The sectional shape obtained when the honeycomb structure 1 of the present embodiment has been cut in the radial direction at a plane perpendicular to the cell-extending direction, is preferred to be a shape suited to the internal shape of an exhaust gas system to which the honeycomb structure 1 is to be fitted. As specific sectional shapes, there can be mentioned a circle, an ellipse, an oblong circle, a trapezoid, a triangle, a tetragon, a hexagon and a special shape which is asymmetric in the right and the left. Of these, a circle, an ellipse and an oblong circle are preferred.

The honeycomb structure of the present invention can be produced based on, for example, a known conventional process for producing a diesel particulate filter (DPF). However, in the honeycomb structure of the present invention, the permeability of the partition wall is controlled in a particular range; therefore, the permeability of the partition wall is controlled in a particular range, for example, by appropriately selecting and preparing the chemical composition of the materials used, or, when a pore former is used for obtaining a porous structure, appropriately selecting and preparing the kind, particle size, addition amount, etc. of the pore former used.

Next, description is made on an embodiment of the honeycomb catalyst structure of the present invention. As shown in FIGS. 1 to 3, the honeycomb catalyst structure 50 of the present embodiment has a honeycomb structure 1 and a catalyst layer 5 containing a catalyst. The catalyst layer 5 is carried in a layered form on the inner surfaces of pores 25, and a large number of catalyst-carried pores 35 are formed inside each partition wall 4. Incidentally, adjacent cells 3 communicate with each other via each catalyst-carried pore 35. A catalyst layer 15 may be formed on the inner surface of each cell 3.

The partition walls 4 of the honeycomb structure 1 has a permeability specified in a particular range, as mentioned previously. Therefore, in the honeycomb catalyst structure 50 of the present embodiment wherein a catalyst layer 5 is carried on the inner surface of each pore 25 of the honeycomb structure 1, the fine carbon particles, etc. contained in an exhaust gas emitted from a diesel engine are hardly captured by the partition walls 4 and most of them pass through the partition walls 4. That is, as shown in FIG. 2, the exhaust gas which has flowed into each cell 3 of the honeycomb catalyst structure 50 from its one end 2a, passes through each partition wall 4, migrates into adjacent cells 3, and then is discharged outside from other end 2b. Therefore, the honeycomb catalyst structure 50 of the present embodiment is low in pressure loss and, even when used over a long period, hardly shows any increase in pressure loss.

Also, with the honeycomb catalyst structure 50 of the present embodiment, unlike in the case of a conventional honeycomb catalyst structure 60 such as shown in FIGS. 4 to 6, a catalyst layer 5 is carried on the surface of each pore 25 of each partition wall 4. Therefore, the honeycomb catalyst structure 50 is a compact catalyst structure which is superior in purification efficiency to the conventional honeycomb catalyst structure and which can be mounted even in a limited space.

Figure 7:
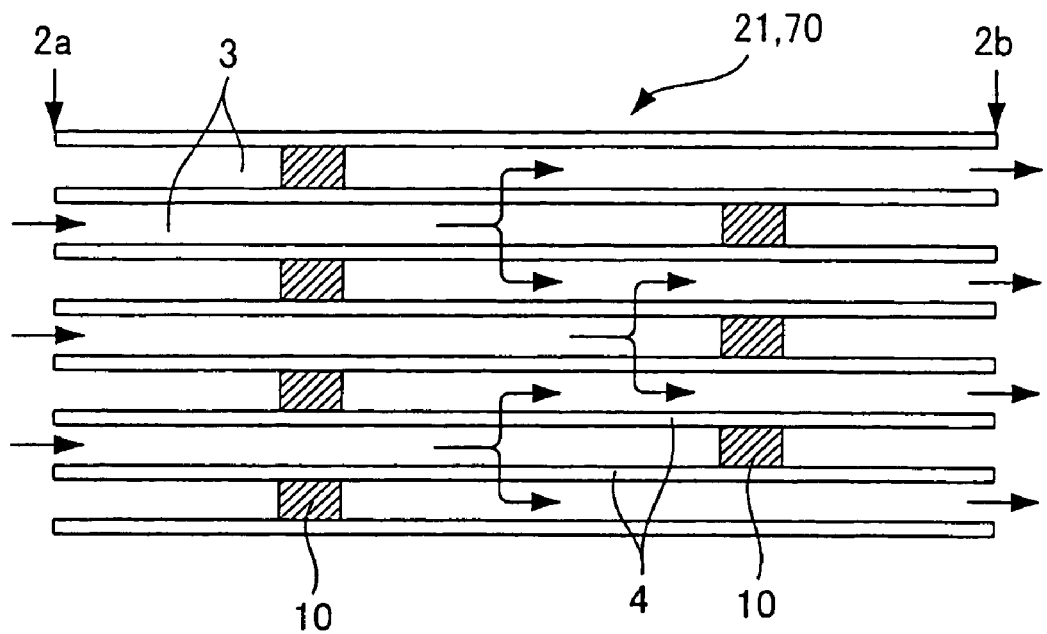
FIG. 7 is a sectional view schematically showing other embodiment of the honeycomb structure and the honeycomb catalyst structure both of the present invention.
Figure 8:
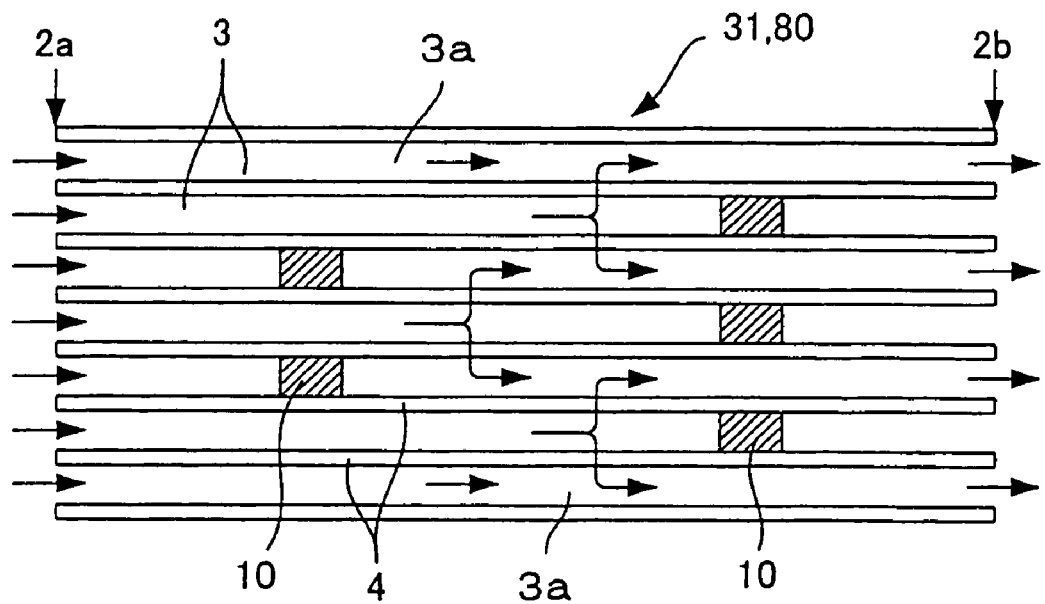
FIG. 8 is a sectional view schematically showing still other embodiment of the honeycomb structure and the honeycomb catalyst structure both of the present invention.
Figure 9:
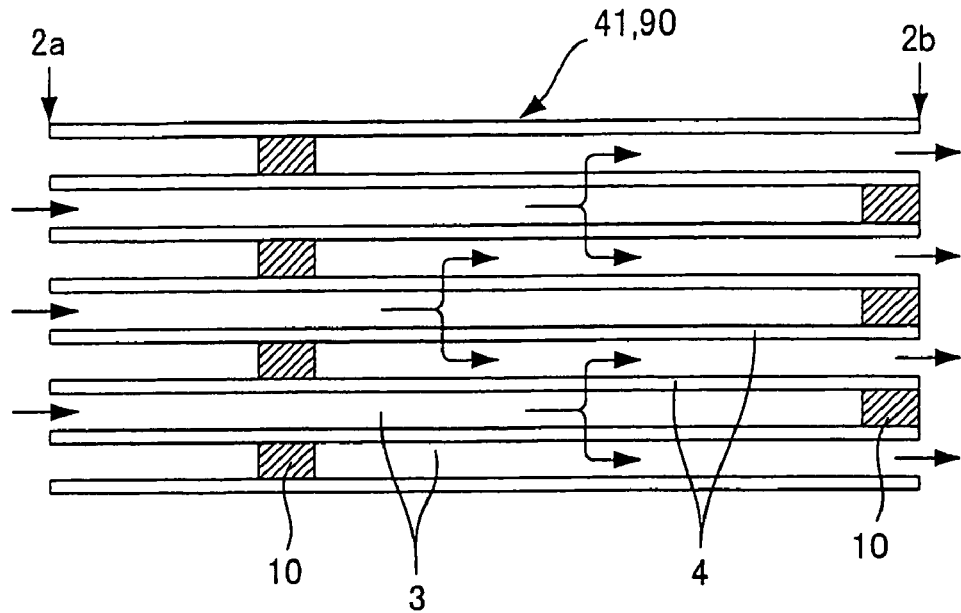
FIG. 9 is a sectional view schematically showing still other embodiment of the honeycomb structure and the honeycomb catalyst structure both of the present invention.

Preferred embodiments of the honeycomb catalyst structure of the present invention include also honeycomb catalyst structures 70, 80 and 90 obtained by forming a catalyst layer on the surface of each pore of each partition wall 4 of the honeycomb structure 21, 31 or 41 shown in FIG. 7, 8 or 9. Preferred embodiments of the honeycomb catalyst structure of the present invention include also honeycomb catalyst structures 110, 120, 130, 140 and 150 obtained by forming a catalyst layer on the surface of pores of partition walls 4 of the honeycomb structure 51, 61, 71, 81 or 91 shown in FIG. 11, 12, 13, 14 or 15.

Each partition wall 4 of the honeycomb catalyst structure 50 of the present embodiment has a permeability of preferably $6.8 \times 10^{-12}$ to $3 \times 10^{-8}$ m$^2$, more preferably $8 \times 10^{-12}$ to $6 \times 10^{-10}$ m$^2$, particularly preferably $2 \times 10^{-11}$ to $2 \times 10^{-10}$ m$^2$. When the permeability of the partition wall 4 is less than $6.8 \times 10^{-12}$ m$^2$, the pressure loss is large and, in long-term use, the pressure loss tends to increase. Meanwhile, when the permeability of the partition wall 4 is more than $3 \times 10^{-8}$ m$^2$, it tends to become difficult to secure the sufficient contact area between exhaust gas and catalyst layer 5.

In the honeycomb catalyst structure 50 of the present embodiment, the cell hydraulic diameter D (m) and the permeability (m$^2$) of the partition walls satisfy preferably a relation of:

(cell hydraulic diameter)$^2$/(permeability)=$2 \times 10^3$ or more and less than $6 \times 10^5$, more preferably a relation of:

(cell hydraulic diameter)$^2$/(permeability)=$5 \times 10^3$ to $1 \times 10^5$, particularly preferably a relation of:

(cell hydraulic diameter)$^2$/(permeability)=$1 \times 10^4$ to $5 \times 10^4$.

A (cell hydraulic diameter)$^2$/(permeability) of $2 \times 10^3$ or more is preferred because a gas flows easily and uniformly in the entire portions of partition walls 4. Meanwhile, a (cell hydraulic diameter)$^2$/(permeability) of less than $6 \times 10^5$ is preferred because the pressure loss of the whole honeycomb catalyst structure 50 increases hardly.

The image maximum distance average of partition wall 4 in a state that a catalyst layer 5 has been carried on the partition wall 4, that is, in a state that catalyst-carried pores 3 have been formed, is preferably 40 to 3,000 μm, more preferably 50 to 500 μm, particularly preferably larger than 250 μm but not larger than 500 μm. When the image maximum distance average is smaller than 40 μm, fine particles such as fine carbon particles contained in the exhaust gas emitted from a diesel engine are captured easily and an increase in pressure loss tends to arise. Meanwhile, when the image maximum distance average is larger than 3,000 μm, it tends to become difficult to secure the sufficient contact area between exhaust gas and catalyst layer.

The porosity of partition wall 4 in a state that a catalyst layer 5 has been carried on the partition wall 4, that is, in a state that catalyst-carried pores 3 have been formed, is preferably 30 to 80%, more preferably 40 to 65%, particularly preferably 50 to 65%. When the porosity is less than 30%, the velocity of gas during passing through partition wall increases and the purification efficiency for gas tends to deteriorate. Meanwhile, when the porosity is more than 80%, the strength of partition wall tends to be insufficient.

Incidentally, when the image maximum distance average is 40 to 3,000 μm and the porosity is 30 to 80%, the resulting honeycomb catalyst structure is suitable as an industrial catalyst structure for purifying the exhaust gas emitted from industrial combustion equipment. When the image maximum distance average is larger than 250 μm but not larger than 500 μm and the porosity is 40 to 65%, the resulting honeycomb catalyst structure is suitable as an industrial catalyst structure, particularly a catalyst structure for vehicle mounting, for purification of the exhaust gas emitted from automobile engines.

In the honeycomb catalyst structure 50 of the present embodiment, the ratio (L/d) of the equivalent diameter d of honeycomb catalyst structure and the length L of honeycomb catalyst structure in central axis direction is preferably more than 0.3 but less than 0.75, more preferably 0.3 to 0.5. Here, the "equivalent diameter d" is a value obtained by quadruplicating the area of the section of honeycomb catalyst structure perpendicular to central axis and dividing the product by the "length of circumference of the section". When the length L of honeycomb catalyst structure in central axis direction is too large (L/d is too large) the velocity of fluid passing through partition wall is not constant in the central axis direction of honeycomb catalyst structure and there arises a distribution of velocity. As a result, it occur in some cases that, for example, a large amount of an exhaust gas passes through only the partition wall portion in the vicinity of catalyst structure outlet, only the catalyst coated on that portion undergoes a load, and the catalyst coated on other portion is not used effectively (becomes useless). Meanwhile, when the L/d is small, the distribution of the velocity of fluid passing through partition wall is uniform in the central axis direction of honeycomb catalyst structure and the catalyst coated on the whole portion of partition wall is used effectively, whereby an improved purification performance is obtained. Meanwhile, when the L/d is too small, the ratio of the length of plugged portion to the length of honeycomb catalyst structure in central axis direction increases and the mass ratio of the partition wall portion not usable for carrying catalyst increases; as a result, the warm-up property of catalyst deteriorates and the purification performance for gas may deteriorate.

In the honeycomb catalyst structure 50 of the present embodiment, it is preferred that the ratio (L/d) of the equivalent diameter d and the length L in central axis direction is 0.3 or more but less than 0.75, the cell density is 4 to 46.5 cells/cm², the partition wall thickness is 0.3 to 0.43 mm, the image maximum distance average is 250 to 500 μm, the porosity is 60 to 80% and the standard deviation of the common logarithm of pore diameter distribution is 0.2 to 0.6. By allowing the L/d, the cell density, the partition wall thickness, the image maximum distance average of partition wall, the porosity of partition wall and the standard deviation of the common logarithm of pore diameter distribution of partition wall to satisfy the above-mentioned particular respective ranges simultaneously, there can be obtained a honeycomb catalyst structure which is superior particularly in purification efficiency, is small in pressure loss, and can be mounted even in a limited space.

As specific examples of the catalyst contained in the catalyst layer 5 constituting the honeycomb catalyst structure 50 of the present embodiment, there can be mentioned (1) a three-way catalyst for purification of exhaust gas of gasoline engine, (2) an oxidation catalyst for purification of exhaust gas of gasoline engine or diesel engine, (3) a SCR catalyst for NOx selective reduction, and (4) an NOx storage catalyst.

The three-way catalyst for purification of exhaust gas of gasoline engine contains a carrier coat for covering of partition walls of honeycomb structure (honeycomb carrier) and a noble metal dispersed in and carried on the carrier coat. The carrier coat is constituted by, for example, active alumina. As preferred examples of the noble metal dispersed in and carried on the carrier coat, there can be mentioned Pt, Rh, Pd and combinations thereof. The carrier coat further contains a compound such as cerium oxide, zirconium oxide, silica or the like, or a mixture thereof. Incidentally, it is preferred that the total amount of noble metals is controlled at 0.17 to 7.07 g per liter of honeycomb structure.

The oxidation catalyst for purification of exhaust gas of gasoline engine or diesel engine contains a noble metal. As the noble metal, there is preferred at least one member selected from the group consisting of Pt, Rh and Pd. Incidentally, it is preferred that the total amount of noble metals is controlled at 0.17 to 7.07 g per liter of honeycomb structure. The SCR catalyst for NOx selective reduction contains at least one member selected from the group consisting of metal-substituted zeolite, vanadium, titania, tungsten oxide, silver and alumina.

The NOx storage catalyst contains an alkali metal and/or an alkaline earth metal. As the alkali metal, there can be mentioned K, Na and Li. As the alkaline earth metal, Ca can be mentioned. Incidentally, it is preferred that the total amount of K, Na, Li and Ca is controlled at 5 g or more per liter of honeycomb structure.

The honeycomb catalyst structure of the present invention can be produced by carrying a catalyst on the above-mentioned honeycomb structure based the known conventional method. Specifically explaining, firstly, a catalyst slurry containing a catalyst is prepared; then, the catalyst slurry is coated on the pore surfaces of the partition walls of a honeycomb structure by suction or the like; thereafter, drying is conducted at room temperature or with heating; thereby, a honeycomb catalyst structure of the present invention can be produced.

EXAMPLES

The present invention is explained specifically below based on Examples. However, the present invention is in no way restricted to these Examples.

[Pore Diameter]

Pore diameters were measured by image analysis and an image maximum distance average was calculated. Specifically explaining, SEM photographs of partition wall section are observed for 20 visual fields each of (length×width=t×t) wherein "t" is the thickness of partition wall; then, in each visual field observed, the maximum straight line distance of pore is measured; an average of the maximum straight line distances of all the visual fields is calculated; the average was taken as "image maximum distance average". The magnification of SEM photograph was 50. Also, pore diameter distribution was measured using a mercury porosimeter [Auto Pore III Model 9405 (trade name) produced by Micromeritics Co.], and standard deviation of pore diameter distribution (pore diameter distribution σ) was calculated.

[Porosity]

Porosity was measured by image analysis. Specifically explaining, SEM photographs of partition wall section are observed for at least 5 visual fields each of (length×width=t×t) wherein "t" is the thickness of partition wall; in each visual field observed, a ratio of pore area is determined; each ratio is raised to the three seconds (3/2) power; an average of the resulting values of all the visual fields is calculated and was taken as "porosity".

[Permeability]

Part of partition wall was cut out and processed so as to remove the surface unevenness to prepare a sample; the sample was held between two sample holders of 20 mm in diameter (the holders were put on and beneath the sample) so that there was no gas leakage; a gas was allowed to permeate the sample at a particular pressure so that the pressure downstream of the sample became 1 atom. In this case, the gas which permeated the sample, was calculated for permeability, based on the following expression (1). Incidentally, in the following expression (1), C is a permeability (m²); F is a gas flow rate (cm³/s); T is a sample thickness (cm); V is a gas viscosity (dynes·sec/cm²); D is a sample diameter (cm); and P is a gas pressure (PSI). In the following expression (1), 13.839 (PSI)=1 (atm), and 68947.6 (dynes·sec/cm²)=1 (PSI). Incidentally, in the measurement, there was used an apparatus such as Capillary Flow Pormeter Model 1100AEX (trade name) produced by Porous Materials, Inc.

[Expression 3]

$$C=[8FTV\div(\pi D^2(P^2-13.839^2)/(13.839\times 68947.6))]\times 10^{-4} \quad (1)$$

[Purification Index]

A combustion gas consisting of 7 vol. % of oxygen, 10 vol. % of steam, 10 vol. % of carbon dioxide, 200 ppm (in terms of carbon moles) of hydrocarbons and the remainder of nitrogen was allowed to flow into a honeycomb structure or a honeycomb catalyst structure at a space velocity (SV) of 100,000 h$^{-1}$ at 200° C. Hydrocarbons concentrations in combustion gas before and after flowing-into were measured and a purification ratio (%) was calculated. Also, a purification ratio (a standard purification ratio) (%) was calculated for a honeycomb catalyst structure for comparison, and the proportion of the above purification ratio to the standard purification ratio was calculated and taken as purification index (%). Here, purification index=200% means a purification ratio which is two times the purification ratio of the honeycomb catalyst structure for comparison. Incidentally, for a honeycomb catalyst structure intended for use in automobiles, there was used, as the honeycomb catalyst structure for comparison, one shown in FIGS. 4 to 6, obtained by carrying a catalyst on a simple honeycomb structure (without plugged portion) having a cell density of 600 cpsi (93 cells/cm$^2$) and a partition wall thickness of 4.5 mil (0.1143 mm). Also, for a honeycomb catalyst structure intended for industrial use, there was used, as the honeycomb catalyst structure for comparison, one shown in FIGS. 4 to 6, obtained by carrying a catalyst on a simple honeycomb structure (without plugged portion) having a cell density of 30 cpsi (4.65 cells/cm$^2$) and a partition wall thickness of 32 mil (0.8128 mm).

[Pressure Loss]

Air was passed through a honeycomb catalyst structure at room temperature at a velocity of 0.5 m$^3$/min to measure a pressure loss. A pressure loss (a standard pressure loss) was also measured for a honeycomb catalyst structure for comparison, of the same shape, the same cell density and the same partition wall thickness. A ratio (a pressure loss increase ratio) (%) of the above pressure loss to the standard pressure loss was calculated. When the pressure loss increase ratio was 20% or more, it was rated as pressure loss increase="yes", and, when the pressure loss increase ratio was less than 20%, it was rated as pressure loss increase="no".

[Long-Term Plugging Resistance]

A fuel obtained by adding 5 parts by mass of a commercial engine oil to 95 parts by mass of a gas oil for burner was burnt in a lean state which generated no soot. The resulting combustion gas was allowed to pass through a honeycomb catalyst structure at 600° C. at a velocity of 2.1 Nm$^3$/min, over a long period. "Long-term plugging resistance" was evaluated based on the following standard.

⊚: No problem and good.

◯: Slight plugging but actually usable.

X: Actual use is impossible due to plugging.

Examples 1 to 17, Comparative Examples 1 to 3

A plurality of members selected from talc, kaolin, calcinated kaolin, alumina, aluminum hydroxide and silica were mixed as raw materials for formation of cordierite, in such proportions as to give a chemical composition of 42 to 56 mass % of $SiO_2$, 0 to 45 mass % of $Al_2O_3$ and 12 to 16 mass % of MgO. To 100 parts by mass of the resulting mixture were added 12 to 25 parts by mass of graphite as a pore former and 5 to 15 parts by mass of a synthetic resin. There were further added appropriate amounts of methyl cellulose and a surfactant, followed by addition of water and kneading, whereby a puddle was prepared. The puddle was degassed under vacuum and then subjected to extrusion molding to obtain a honeycomb formed material. The honeycomb formed material was dried and then fired at the maximum temperature of 1,400 to 1,430° C. to obtain a honeycomb fired material. At either one end of the honeycomb fired material was filled a plugging material in a checkered pattern, followed by refiring, whereby were produced honeycomb structures (Examples 1 to 17 and Comparative Examples 1 to 3) of 144 mm in diameter and 152 mm in total length, having a partition wall pore structure shown in Table 1. Incidentally, the partition wall pore structure was adjusted by appropriately adjusting the chemical composition of raw materials for formation of cordierite, the particle diameter of pore former, the addition amount of pore former, etc. The plugging depth (length) of each plugged portion was 10 mm from the end.

TABLE 1

| | Cell density | | Cell pitch | Partition wall thickness | | Cell hydraulic diameter (m) | Av. pore diameter (μm) | Porosity (%) | Permeability (m$^2$) | (Cell hydraulic diameter)$^2$/ permeability | Pore diameter distribution σ |
|---|---|---|---|---|---|---|---|---|---|---|---|
| | (Cells/cm$^2$) | (cpsi) | (mm) | (mm) | (mil) | | | | | | |
| Ex. 1 | 12.40 | 80 | 2.84 | 0.508 | 20 | 0.0023 | 100 | 52 | 3.43 × 10$^{-11}$ | 1.59 × 10$^5$ | 0.3 |
| Ex. 2 | 7.75 | 50 | 3.59 | 0.508 | 20 | 0.0031 | 100 | 52 | 3.43 × 10$^{-11}$ | 2.77 × 10$^5$ | 0.3 |
| Ex. 3 | 7.75 | 50 | 3.59 | 0.508 | 20 | 0.0031 | 260 | 52 | 2.32 × 10$^{-10}$ | 4.10 × 10$^4$ | 0.3 |
| Ex. 4 | 12.40 | 80 | 2.84 | 0.508 | 20 | 0.0023 | 750 | 52 | 1.93 × 10$^{-9}$ | 2.82 × 10$^3$ | 0.3 |
| Ex. 5 | 31.00 | 200 | 1.80 | 0.2032 | 8 | 0.0016 | 100 | 52 | 3.43 × 10$^{-11}$ | 7.40 × 10$^4$ | 0.4 |
| Ex. 6 | 12.40 | 80 | 2.84 | 0.508 | 20 | 0.0023 | 900 | 52 | 2.78 × 10$^{-9}$ | 1.96 × 10$^3$ | 0.3 |
| Comp. Ex. 1 | 12.40 | 80 | 2.84 | 0.508 | 20 | 0.0023 | 45 | 52 | 6.94 × 10$^{-12}$ | 7.83 × 10$^5$ | 0.3 |
| Ex. 7 | 12.40 | 80 | 2.84 | 0.508 | 20 | 0.0023 | 280 | 52 | 2.69 × 10$^{-10}$ | 2.02 × 10$^4$ | 0.3 |
| Ex. 8 | 12.40 | 80 | 2.84 | 0.508 | 20 | 0.0023 | 500 | 52 | 8.57 × 10$^{-10}$ | 6.34 × 10$^3$ | 0.4 |
| Ex. 9 | 15.50 | 100 | 2.54 | 0.4318 | 17 | 0.0021 | 50 | 52 | 8.57 × 10$^{-12}$ | 5.19 × 10$^5$ | 0.3 |
| Ex. 10 | 15.50 | 100 | 2.54 | 0.4318 | 17 | 0.0021 | 400 | 52 | 5.49 × 10$^{-10}$ | 8.10 × 10$^3$ | 0.4 |
| Ex. 11 | 46.50 | 300 | 1.47 | 0.3048 | 12 | 0.0012 | 50 | 52 | 8.57 × 10$^{-12}$ | 1.57 × 10$^5$ | 0.5 |
| Comp. Ex. 2 | 46.50 | 300 | 1.47 | 0.3048 | 12 | 0.0012 | 25 | 52 | 2.14 × 10$^{-12}$ | 6.30 × 10$^5$ | 0.5 |
| Ex. 12 | 46.50 | 300 | 1.47 | 0.3048 | 12 | 0.0012 | 450 | 52 | 6.94 × 10$^{-10}$ | 1.94 × 10$^3$ | 0.5 |
| Ex. 13 | 0.25 | 1.61 | 20.02 | 6.985 | 275 | 0.0130 | 450 | 49 | 6.94 × 10$^{-10}$ | 2.45 × 10$^5$ | 0.5 |
| Ex. 14 | 1.55 | 10 | 8.03 | 1.016 | 40 | 0.0070 | 200 | 49 | 1.37 × 10$^{-10}$ | 3.59 × 10$^5$ | 0.6 |
| Ex. 15 | 1.55 | 10 | 8.03 | 1.016 | 40 | 0.0070 | 260 | 49 | 2.32 × 10$^{-10}$ | 2.12 × 10$^5$ | 0.6 |
| Ex. 16 | 1.55 | 10 | 8.03 | 1.016 | 40 | 0.0070 | 150 | 49 | 7.71 × 10$^{-11}$ | 6.38 × 10$^5$ | 0.6 |
| Ex. 17 | 0.25 | 1.61 | 20.02 | 6.985 | 275 | 0.0130 | 250 | 49 | 2.14 × 10$^{-10}$ | 7.93 × 10$^5$ | 0.5 |
| Comp. Ex. 3 | 0.25 | 1.61 | 20.02 | 6.985 | 275 | 0.0130 | 5000 | 49 | 8.57 × 10$^{-8}$ | 1.98 × 10$^3$ | 0.5 |

Examples 18 to 34, Comparative Examples 4 to 6

There was prepared a catalyst slurry containing platinum (Pt) as a noble metal and further containing active alumina and, as an oxygen-storage agent, ceria. The catalyst slurry was coated, by suction, on the inner surface of partition wall and inner surface of pore of each of the honeycomb structures of Examples 1 to 17 and Comparative Examples 1 to 3, to prepare a coated layer of the catalyst slurry. Then, drying was conducted with heating to produce honeycomb catalyst structures of Examples 18 to 34 and Comparative Examples 4 to 6, each having a pore structure of partition wall (with catalyst layer) shown in Table 2. Incidentally, the amount of noble metal (Pt) per liter of honeycomb structure (carrier) was 2 g. Also, the coated amount of catalyst slurry per liter of honeycomb structure (carrier) was 100 g.

TABLE 2

| | Honeycomb structure | Cell density (Cells/cm$^2$) | (cpsi) | Cell pitch (mm) | Partition wall thickness (mm) | (mil) | Cell hydraulic diameter (m) | Av. pore diameter (μm) | Porosity (%) | Permeability (m$^2$) | (Cell hydraulic diameter)$^2$/permeability | Pore diameter distribution σ |
|---|---|---|---|---|---|---|---|---|---|---|---|---|
| Ex. 18 | Ex. 1 | 12.74 | 80 | 2.84 | 0.508 | 20 | 0.0023 | 95 | 38 | 3.09 × 10$^{-11}$ | 1.76 × 10$^5$ | 0.3 |
| Ex. 19 | Ex. 2 | 7.75 | 50 | 3.59 | 0.508 | 20 | 0.0031 | 95 | 38 | 3.09 × 10$^{-11}$ | 3.07 × 10$^5$ | 0.3 |
| Ex. 20 | Ex. 3 | 7.75 | 50 | 3.59 | 0.508 | 20 | 0.0031 | 250 | 38 | 2.14 × 10$^{-10}$ | 4.44 × 10$^4$ | 0.3 |
| Ex. 21 | Ex. 4 | 12.40 | 80 | 2.84 | 0.508 | 20 | 0.0023 | 730 | 38 | 1.83 × 10$^{-9}$ | 2.98 × 10$^3$ | 0.3 |
| Ex. 22 | Ex. 5 | 31.00 | 200 | 1.80 | 0.2032 | 8 | 0.0016 | 90 | 40 | 2.78 × 10$^{-11}$ | 9.14 × 10$^4$ | 0.4 |
| Ex. 23 | Ex. 6 | 12.40 | 80 | 2.84 | 0.508 | 20 | 0.0023 | 800 | 38 | 2.19 × 10$^{-9}$ | 2.48 × 10$^3$ | 0.3 |
| Comp. Ex. 4 | Comp. Ex. 1 | 12.40 | 80 | 2.84 | 0.508 | 20 | 0.0023 | 44 | 38 | 6.64 × 10$^{-12}$ | 8.19 × 10$^5$ | 0.3 |
| Ex. 24 | Ex. 7 | 12.40 | 80 | 2.84 | 0.508 | 20 | 0.0023 | 280 | 38 | 2.69 × 10$^{-10}$ | 2.02 × 10$^4$ | 0.3 |
| Ex. 25 | Ex. 8 | 12.40 | 80 | 2.84 | 0.508 | 20 | 0.0023 | 480 | 38 | 7.90 × 10$^{-10}$ | 6.88 × 10$^3$ | 0.4 |
| Ex. 26 | Ex. 9 | 15.50 | 100 | 2.54 | 0.4318 | 17 | 0.0021 | 48 | 39 | 7.90 × 10$^{-12}$ | 5.63 × 10$^5$ | 0.3 |
| Ex. 27 | Ex. 10 | 15.50 | 100 | 2.54 | 0.4318 | 17 | 0.0021 | 380 | 39 | 4.95 × 10$^{-10}$ | 8.98 × 10$^3$ | 0.4 |
| Ex. 28 | Ex. 11 | 46.50 | 300 | 1.47 | 0.3048 | 12 | 0.0012 | 48 | 40 | 7.90 × 10$^{-12}$ | 1.71 × 10$^5$ | 0.5 |
| Comp. Ex. 5 | Comp. Ex. 2 | 46.50 | 300 | 1.47 | 0.3048 | 12 | 0.0012 | 23 | 40 | 1.81 × 10$^{-12}$ | 7.44 × 10$^5$ | 0.5 |
| Ex. 29 | Ex. 12 | 46.50 | 300 | 1.47 | 0.3048 | 12 | 0.0012 | 440 | 40 | 6.64 × 10$^{-10}$ | 2.03 × 10$^3$ | 0.5 |
| Ex. 30 | Ex. 13 | 0.25 | 1.61 | 20.02 | 6.985 | 275 | 0.0130 | 445 | 38 | 6.79 × 10$^{-10}$ | 2.50 × 10$^5$ | 0.5 |
| Ex. 31 | Ex. 14 | 1.55 | 10 | 8.03 | 1.016 | 40 | 0.0070 | 195 | 38 | 1.30 × 10$^{-10}$ | 3.78 × 10$^5$ | 0.6 |
| Ex. 32 | Ex. 15 | 1.55 | 10 | 8.03 | 1.016 | 40 | 0.0070 | 150 | 38 | 7.71 × 10$^{-11}$ | 6.38 × 10$^5$ | 0.6 |
| Ex. 33 | Ex. 16 | 1.55 | 10 | 8.03 | 1.016 | 40 | 0.0070 | 140 | 38 | 6.72 × 10$^{-11}$ | 7.33 × 10$^5$ | 0.6 |
| Ex. 34 | Ex. 17 | 0.25 | 1.61 | 20.02 | 6.985 | 275 | 0.0130 | 235 | 38 | 1.89 × 10$^{-10}$ | 8.97 × 10$^5$ | 0.5 |
| Comp. Ex. 6 | Comp. Ex. 3 | 0.25 | 1.61 | 20.02 | 6.985 | 275 | 0.0130 | 4800 | 38 | 7.90 × 10$^{-9}$ | 2.15 × 10$^3$ | 0.5 |

The produced honeycomb catalyst structures of Examples 18 to 34 and Comparative Examples 4 to 6 were measured and calculated for purification index and pressure loss increase ratio. The results are shown in Table 3. These structures were also evaluated for pressure loss increase and long-term plugging resistance. The results are shown in Table 3.

TABLE 3

| | Purification index (%) | Pressure loss increase | Pressure loss increase ratio (%) | Long-term plugging resistance |
|---|---|---|---|---|
| Ex. 18 | 200 | No | 7 | ○ |
| Ex. 19 | 150 | No | 6 | ○ |
| Ex. 20 | 120 | No | 2 | ◎ |
| Ex. 21 | 120 | No | 5 | ◎ |
| Ex. 22 | 120 | No | 4.5 | ○ |
| Ex. 23 | 50 | No | 5 | ◎ |
| Comp. Ex. 4 | 250 | Yes | 20 | X |
| Ex. 24 | 150 | No | 3 | ◎ |
| Ex. 25 | 140 | No | 2 | ◎ |
| Ex. 26 | 200 | No | 6 | ○ |
| Ex. 27 | 170 | No | 3 | ◎ |
| Ex. 28 | 300 | No | 7 | ○ |
| Comp. Ex. 5 | 200 | Yes | 30 | X |
| Ex. 29 | 40 | No | 7 | ◎ |
| Ex. 30 | 150 | No | 8 | ◎ |
| Ex. 31 | 200 | No | 3 | ◎ |
| Ex. 32 | 180 | No | 2 | ◎ |
| Ex. 33 | 250 | No | 30 | ○ |
| Ex. 34 | 200 | No | 20 | ○ |
| Comp. Ex. 6 | 40 | No | 7.5 | ◎ |

(Discussion 1)

It is clear from Tables 1 to 3 that the honeycomb catalyst structures of Examples 18 to 34 produced using the honeycomb structures of Examples 1 to 17, as compared with the honeycomb catalyst structures of Comparative Examples 4 to 6, are high in purification index and show superior purification performances. It is also clear that the honeycomb catalyst structures of Examples 18 to 34, as compared with the honeycomb catalyst structures of Comparative Examples 4 to 6, show no pressure loss increase, are low in pressure loss increase ratio, and good in long-term plugging resistance.

Examples 35 to 38

A honeycomb fired material was produced in the same manner as in Example 1. Part of the cells of the honeycomb fired material were left as through-hole cells; the remaining cells were filled with a plugging material at each one end (gas inlet side end); and the resulting honeycomb material was fired again to obtain four kinds of honeycomb structures which were similar in structure to the honeycomb structure 71 shown in FIG. 13 and wherein the proportions of through-hole cells were different from each other. The proportions (%)

of through-hole cells were 35% (Example 35), 45% (Example 36), 55% (Example 37) and 20% (Example 38). Each honeycomb structure obtained was a cordierite-made honeycomb structure having a diameter of 105.7 mm, a length of 114.2 mm (resultantly, a volume of 1 liter), a partition wall thickness of 8 mil (0.203 mm), a cell density of 300 cells/in² (46.5 cells/cm²), an image maximum distance average of partition wall, of 40 μm, and a partition wall porosity of 60%.

A catalyst slurry was sucked under vacuum from the outlet side end of each honeycomb structure obtained above, to carry, on the surface of each partition wall, 150 of γ-alumina/ceria, 2 g of platinum (Pt) and 0.5 g of rhodium (Rh) per liter of honeycomb structure to obtain honeycomb catalyst structures of Examples 35 to 38. The catalyst slurry was prepared according to the methods mentioned below. Each honeycomb catalyst structure was measured for purification ratio of hydrocarbons and pressure loss according to the following methods. The results obtained are shown in Table 4 (plugged pattern 1).

(Catalyst Slurry)

A γ-alumina/ceria mixture (specific surface are: 50 m²/g, initial, disintegrated particle diameter: 50 μm) was wet-disintegrated in a ball mill to convert the diameter into an average, disintegrated particle diameter of 5 μm. The resulting disintegrated particles were mixed with a solution containing platinum and rhodium to carry platinum and rhodium in the fine pores of γ-alumina. Thereby was obtained a catalyst slurry containing γ-alumina of 5 μm in average, disintegrated particle diameter, carried with platinum and rhodium.

(Hydrocarbon Purification Ratio)

This is a relative ratio to the purification ratio obtained using, as a comparative honeycomb catalyst structure, one (shown in FIGS. 4 to 6) obtained by carrying a catalyst on a simple honeycomb structure (having no plugged portion) having a cell density of 600 cpsi (93 cells/cm²) and a partition wall thickness of 4.5 mil (0.1143 mm). The unit has no dimension.

(Pressure Loss)

This is a relative ratio to the pressure loss obtained using the honeycomb catalyst structure of Example 55 as a comparative honeycomb catalyst structure. The unit has no dimension.

Examples 39 to 42

Four kinds of honeycomb structures were obtained in the same manner as in Example 35 except that the positions for filling a plugging material (the positions for formation of plugged portions) and the proportions of through-hole cells were changed. In the honeycomb structures obtained, as in the honeycomb structure 81 shown in FIG. 14, part of the cells 3 were through-hole cells 3a and the remaining cells 3 had each a plugged portion 10 at one end 2b (a gas outlet side end). The proportions of through-hole cells were 35% (Example 39), 45% (Example 40), 55% (Example 41) and 20% (Example 42).

Each honeycomb structure obtained was carried with a catalyst in the same manner as in Example 35, to obtain honeycomb catalyst structures of Examples 39 to 42. Each honeycomb catalyst structure was measured for hydrocarbon purification ratio and pressure loss according to the above-mentioned methods. The results obtained are shown in Table 4 (plugged pattern 2).

Examples 43 to 46

Four kinds of honeycomb structures were obtained in the same manner as in Example 35 except that the positions for filling a plugging material (the positions for formation of plugged portions) and the proportions of through-hole cells were changed. In the honeycomb structures obtained, as in the honeycomb structure 51 shown in FIG. 11, part of the cells 3 were through-hole cells 3a and the remaining cells 3 had each a plugged portion 10 at end 2a or end 2b. The proportions of through-hole cells were 35% (Example 43), 45% (Example 44), 55% (Example 45) and 20% (Example 46).

Each honeycomb structure obtained was carried with a catalyst in the same manner as in Example 35, to obtain honeycomb catalyst structures of Examples 43 to 46. Each honeycomb catalyst structure was measured for hydrocarbon purification ratio and pressure loss according to the above-mentioned methods. The results obtained are shown in Table 4 (plugged pattern 3).

Examples 47 to 50

Four kinds of honeycomb structures were obtained in the same manner as in Example 35 except that the positions for filling a plugging material (the positions for formation of plugged portions) and the proportions of through-hole cells were changed. In the honeycomb structures obtained, as in the honeycomb structure 61 shown in FIG. 12, part of the cells 3 were through-hole cells 3a and the remaining cells 3 had each inside a plugged portion 10 so that such plugged portions 10 were arranged at the same position in the central axis direction of the honeycomb structure. The proportions of through-hole cells were 35% (Example 47), 45% (Example 48), 55% (Example 49) and 20% (Example 50).

Each honeycomb structure obtained was carried with a catalyst in the same manner as in Example 35, to obtain honeycomb catalyst structures of Examples 47 to 50. Each honeycomb catalyst structure was measured for hydrocarbon purification ratio and pressure loss according to the above-mentioned methods. The results obtained are shown in Table 4 (plugged pattern 4).

Examples 51 to 54

Four kinds of honeycomb structures were obtained in the same manner as in Example 35 except that the positions for filling a plugging material (the positions for formation of plugged portions) and the proportions of through-hole cells were changed. In the honeycomb structures obtained, as in the honeycomb structure 31 shown in FIG. 8, part of the cells 3 were through-hole cells 3a and the remaining cells 3 had each inside a plugged portion 10 at a different position in the central axis direction of the honeycomb structure. The proportions of through-hole cells were 35% (Example 51), 45% (Example 52), 55% (Example 53) and 20% (Example 54).

Each honeycomb structure obtained was carried with a catalyst in the same manner as in Example 35, to obtain honeycomb catalyst structures of Examples 51 to 55. Each honeycomb catalyst structure was measured for hydrocarbon purification ratio and pressure loss according to the above-mentioned methods. The results obtained are shown in Table 4 (plugged pattern 5).

Example 55

A honeycomb structure was obtained in the same manner as in Example 35 except that the positions for filling a plugging material (the positions for formation of plugged portions) and the proportion of through-hole cells were changed. In the honeycomb structure obtained, as in the honeycomb structure 1 shown in FIG. 2, there was no through-hole cell and all the cells 3 had each a plugged portion 10 at end 2a or end 2b so that each end showed a checkered pattern.

The honeycomb structure obtained was carried with a catalyst in the same manner as in Example 35, to obtain a honeycomb catalyst structure of Example 55. The honeycomb catalyst structure was measured for hydrocarbon purification ratio and pressure loss according to the above-mentioned methods. The results obtained are shown in Table 4 (plugged pattern 6).

TABLE 4

| | Plugged pattern | Proportion of through-hole cells (%) | Hydrocarbon purification Ratio | Pressure loss |
|---|---|---|---|---|
| Ex. 35 | 1 | 35 | 1.5 | 0.9 |
| Ex. 36 | 1 | 45 | 2.0 | 0.6 |
| Ex. 37 | 1 | 55 | 2.5 | 0.5 |
| Ex. 38 | 1 | 20 | 0.8 | 1.5 |
| Ex. 39 | 2 | 35 | 1.6 | 0.8 |
| Ex. 40 | 2 | 45 | 2.0 | 0.5 |
| Ex. 41 | 2 | 55 | 2.4 | 0.3 |
| Ex. 42 | 2 | 20 | 0.7 | 2.5 |
| Ex. 43 | 3 | 35 | 1.3 | 0.7 |
| Ex. 44 | 3 | 45 | 2.5 | 0.5 |
| Ex. 45 | 3 | 55 | 2.5 | 0.3 |
| Ex. 46 | 3 | 20 | 0.8 | 3.0 |
| Ex. 47 | 4 | 35 | 1.6 | 0.8 |
| Ex. 48 | 4 | 45 | 2.0 | 0.6 |
| Ex. 49 | 4 | 55 | 2.5 | 0.7 |
| Ex. 50 | 4 | 20 | 0.9 | 2.5 |
| Ex. 51 | 5 | 35 | 2.3 | 1.0 |
| Ex. 52 | 5 | 45 | 2.5 | 0.9 |
| Ex. 53 | 5 | 55 | 2.8 | 0.8 |
| Ex. 54 | 5 | 20 | 0.9 | 2.5 |
| Ex. 55 | 6 | 0 | 1.5 | 1.0 |

(Discussion 2)

It is clear from Table 4 that a higher proportion of through-hole cells gives a lower pressure loss in the honeycomb catalyst structures of Examples 35 to 38. Of these four Examples, the pressure loss is particularly large in Example 38 of 20% through-hole cells proportion. As to the relation between the proportion of through-hole cells and the pressure loss, the same results were obtained also in other Examples having plugged portions at different positions.

Examples 56 to 61

Honeycomb catalyst structures of Examples 56 to 61, each having a pore structure of partition wall (with catalyst layer) shown in Table 2 were produced in the same manner as used in production of the honeycomb catalyst structure of Example 18.

TABLE 5

| | Cell density (Cells/cm$^2$) | (cpsi) | Cell pitch (mm) | Partition wall thickness (mm) | (mil) | Cell hydraulic diameter (m) | Av. Pore diameter (μm) | Porosity (%) | Permeability (m$^2$) | (Cell hydraulic diameter)$^2$/ permeability | Pore diameter distribution σ |
|---|---|---|---|---|---|---|---|---|---|---|---|
| Ex. 56 | 15.5 | 100 | 2.54 | 0.4318 | 17 | 0.0021 | 250 | 60 | $1.10 \times 10^{-11}$ | $4.00 \times 10^5$ | 0.55 |
| Ex. 57 | 15.5 | 100 | 2.54 | 0.4318 | 17 | 0.0021 | 260 | 63 | $1.20 \times 10^{-11}$ | $4.00 \times 10^5$ | 0.50 |
| Ex. 58 | 15.5 | 100 | 2.54 | 0.4318 | 17 | 0.0021 | 270 | 64 | $1.55 \times 10^{-11}$ | $3.00 \times 10^5$ | 0.50 |
| Ex. 59 | 15.5 | 100 | 2.54 | 0.4318 | 17 | 0.0021 | 290 | 70 | $1.70 \times 10^{-11}$ | $3.00 \times 10^5$ | 0.45 |
| Ex. 60 | 15.5 | 100 | 2.54 | 0.4318 | 17 | 0.0021 | 200 | 65 | $0.95 \times 10^{-11}$ | $5.00 \times 10^5$ | 0.55 |
| Ex. 61 | 15.5 | 100 | 2.54 | 0.4318 | 17 | 0.0021 | 600 | 65 | $8.60 \times 10^{-10}$ | $5.00 \times 10^3$ | 0.55 |

The produced honeycomb catalyst structures of Examples 56 to 61 were measured and calculated for purification index and pressure loss increase ratio. The results are sown in Table 6. They were also evaluated for long-term plugging resistance. The results are shown in Table 6.

TABLE 6

| | Purification index (%) | Pressure loss increase ratio (%) | Long-term plugging resistance |
|---|---|---|---|
| Ex. 56 | 200 | 5 | ⊚ |
| Ex. 57 | 220 | 3 | ⊚ |
| Ex. 58 | 230 | 3 | ⊚ |
| Ex. 59 | 230 | 3 | ⊚ |
| Ex. 60 | 180 | 15 | ○ |
| Ex. 61 | 110 | 2 | ⊚ |

Examples 61 and 62, Comparative examples 7 and 8

Honeycomb catalyst structures of Examples 61 and 62 and Comparative Examples 7 and 8 each having a pore structure of partition wall (with catalyst layer) shown in Table 7 were produced in the same manner as used in production of the honeycomb catalyst structure of Example 18.

TABLE 7

| | Cell density | | Cell pitch | Partition wall thickness | | Cell hydraulic diameter | Average pore diameter | Porosity | Permeability | (Cell hydraulic diameter)$^2$/ permeability | Pore diameter distribution | Purification index |
|---|---|---|---|---|---|---|---|---|---|---|---|---|
| | L/d | (cell/cm$^2$) | (cpsi) | (mm) | (mm) | (mil) | (m) | (μm) | (%) | (m$^2$) | | σ | (%) |
| Comp. Ex. 7 | 1 | 15.5 | 100 | 2.54 | 0.4318 | 17 | 0.0021 | 290 | 70 | $1.70 \times 10^{-8}$ | $3.00 \times 10^2$ | 0.45 | 150 |
| Ex. 62 | 0.7 | 15.5 | 100 | 2.54 | 0.4318 | 17 | 0.0021 | 290 | 70 | $1.70 \times 10^{-9}$ | $3.00 \times 10^3$ | 0.45 | 230 |
| Ex. 63 | 0.4 | 15.5 | 100 | 2.54 | 0.4318 | 17 | 0.0021 | 290 | 70 | $1.70 \times 10^{-10}$ | $3.00 \times 10^4$ | 0.45 | 230 |
| Comp. Ex. 8 | 0.25 | 15.5 | 100 | 2.54 | 0.4318 | 17 | 0.0021 | 290 | 70 | $1.70 \times 10^{-11}$ | $3.00 \times 10^5$ | 0.45 | 170 |

The purification indices of the produced honeycomb catalyst structures of Examples 61 and 62 and Comparative Examples 7 and 8 are shown in Table 7. It is clear from Table 7 that the purification index is high when L/d is 3.5 or more but less than 0.75.

INDUSTRIAL APPLICABILITY

The honeycomb catalyst structure of the present invention is superior in purification efficiency, is small in pressure loss and can be mounted even in a limited space. Therefore, the honeycomb catalyst structure of the present invention can be suitably used in purification of to-be-purified components contained in, for example, the exhaust gases emitted from automobile engines, construction equipment engines, industrial stationary engines, combustion equipment, etc.

What is claimed is:

1. A honeycomb structure having:
   porous partition walls having a large number of pores, formed so as to produce a plurality of cells extending between the two ends of the honeycomb structure, and
   plugged portions formed so as to plug the cells at either one end of the honeycomb structure or at the insides of the cells,
   wherein the honeycomb structure has the partition walls of a permeability of $7 \times 10^{-12}$ to $4 \times 10^{-8}$ m$^2$, and
   a cell hydraulic diameter (m) and the permeability (m$^2$) of the partition walls satisfy the relation:

(cell hydraulic diameter)$^2$/(permeability) = $1 \times 10^4$ to $5 \times 10^4$.

2. A honeycomb structure according to claim 1, wherein an image maximum distance average is more than 250 μm but not more than 500 μm.

3. A honeycomb structure according to claim 1, wherein a cell density of the cells is 4 to 46.5 cells/cm$^2$, a thickness of the partition walls is 0.3 to 0.43 mm, an image maximum distance average is 250 to 500 μm, and a porosity is 40 to 65%.

4. A honeycomb structure according to claim 1, wherein a cell density of the cells is 0.25 to 46.5 cells/cm$^2$, a thickness of the partition walls is 0.15 to 7 mm, an image maximum distance average is 40 to 3,000 μm, a porosity is 30 to 80%, and a standard deviation of the common logarithm of pore diameter distribution is 0.1 to 0.6.

5. A honeycomb structure according to claim 1, wherein a cell density of the cells is 1.55 to 15.5 cells/cm$^2$, a thickness of the partition walls is 0.4 to 2 mm, an image maximum distance average is 50 to 500 μm, a porosity is 40 to 65%, and a standard deviation of the common logarithm of pore diameter distribution is 0.2 to 0.6.

6. A honeycomb structure according to claim 1, wherein a cell density of the cells is 1.55 to 12.4 cells/cm$^2$, a thickness of the partition walls is 0.7 to 1.5 mm, an image maximum distance average is more than 250 μm but not more than 500 μm, a porosity is 40 to 65%, and a standard deviation of the common logarithm of pore diameter distribution is 0.2 to 0.6.

7. A honeycomb structure according to claim 1, wherein 30 to 90% of the cells are through-hole cells having no plugged portion.

8. A honeycomb structure according to claim 1, wherein 30 to 50% of the cells are through-hole cells having no plugged portion.

9. A honeycomb structure according to claim 1, which is made of a material containing a ceramic as a major component, or of a sintered metal.

10. A honeycomb structure according to claim 9, wherein the ceramic is at least one member selected from the group consisting of silicon carbide, cordierite, alumina titanate, sialon, mullite, silicon nitride, zirconium phosphate, zirconia, titania, alumina and silica.

11. A honeycomb structure according to claim 1, wherein a thermal expansion coefficient at 40 to 800° C. in the extending direction of the cells is less than $1.0 \times 10^{-6}$/° C.

12. A honeycomb catalyst structure having:
    a honeycomb structure set forth in claim 1, and
    a catalyst layer containing a catalyst, carried in a layered form on at least the inner surfaces of the pores of the partition walls of the honeycomb structure.

13. A honeycomb catalyst structure according to claim 12, wherein the partition walls have a permeability of $6.8 \times 10^{-12}$ to $3 \times 10^{-8}$ m$^2$.

14. A honeycomb catalyst structure according to claim 12, wherein an image maximum distance average of the partition walls under a state wherein the catalyst layer is carried is 40 to 3,000 μm and a porosity is 30 to 80%.

15. A honeycomb catalyst structure according to claim 12, wherein an image maximum distance average of the partition walls under a state wherein the catalyst layer is carried is 50 to 500 μm and a porosity is 40 to 65%.

16. A honeycomb catalyst structure according to claim 12, wherein an image maximum distance average of the partition walls under a state wherein the catalyst layer is carried is more than 250 μm but not more than 500 μm and a porosity is 40 to 65%.

17. A honeycomb catalyst structure according to claim 12, wherein the catalyst is a three-way catalyst for purification of gasoline engine exhaust gas, containing:
    a carrier coat comprising active alumina,
    at least one metal carried inside the carrier coat in a dispersed state, selected from the group consisting of Pt, Rh and Pd, and
    at least one compound contained in the carrier coat, selected from the group consisting of cerium oxide, zirconium oxide and silica.

18. A honeycomb catalyst structure according to claim 12, wherein the catalyst is an oxidation catalyst for purification of gasoline engine or diesel engine exhaust gas, containing at least one noble metal selected from the group consisting of Pt, Rh and Pd.

19. A honeycomb catalyst structure according to claim 12, wherein the catalyst is a SCR catalyst for NOx selective reduction, containing at least one member selected from the group consisting of metal-substituted zeolite, vanadium, titania, tungsten oxide, silver and alumina.

20. A honeycomb catalyst structure according to claim 12, wherein the catalyst is an NOx storage catalyst containing an alkali metal and/or an alkaline earth metal.

21. A honeycomb catalyst structure according to claim 12, wherein a ratio (L/d) of equivalent diameter d and length L in central axis direction is 0.3 or more but less than 0.75.

22. A honeycomb catalyst structure according to claim 17, wherein a ratio (L/d) of equivalent diameter d and length L in central axis direction is 0.3 or more but less than 0.75, a cell density is 4 to 46.5 cells/cm$^2$, a thickness of partition wall is 0.3 to 0.43 mm, an image maximum distance average is 250 to 500 μm, a porosity is 60 to 80%, and a standard deviation of the common logarithm of pore diameter distribution is 0.2 to 0.6.

* * * * *